United States Patent
Wu

(10) Patent No.: US 10,807,677 B2
(45) Date of Patent: Oct. 20, 2020

(54) DIRECTIONAL TRANSMISSION MECHANISM, DIRECTIONAL SPROCKET APPARATUS AND PEDAL DEVICE

(71) Applicant: SHENZHEN GENIUSMART TECHNOLOGIES CO., LTD., Shenzhen (CN)

(72) Inventor: Jun Wu, Shenzhen (CN)

(73) Assignee: Shenzhen Geniusmart Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/514,376

(22) Filed: Jul. 17, 2019

(65) Prior Publication Data

US 2019/0337589 A1 Nov. 7, 2019

Related U.S. Application Data

(60) Division of application No. 15/597,924, filed on May 17, 2017, now Pat. No. 10,392,077, which is a (Continued)

(30) Foreign Application Priority Data

| Jul. 17, 2015 | (CN) | .......................... | 2015 1 0422426 |
| Nov. 30, 2015 | (CN) | ..................... | 2015 2 0972479 U |
| Jan. 20, 2016 | (CN) | ..................... | 2016 2 0057088 U |

(51) Int. Cl.
*B62M 11/06* (2006.01)
*F16D 41/36* (2006.01)
(Continued)

(52) U.S. Cl.
CPC .............. *B62M 11/06* (2013.01); *B62M 1/36* (2013.01); *B62M 6/55* (2013.01); *B62M 9/10* (2013.01);
(Continued)

(58) Field of Classification Search
CPC ........ B62M 11/00; B62M 11/06; B62M 9/10; F16H 37/043
See application file for complete search history.

(56) References Cited

U.S. PATENT DOCUMENTS

| 4,135,409 A | * | 1/1979 | Ishimaru | ................ B62M 11/06 280/252 |
| 4,716,777 A | * | 1/1988 | Hartmann | ................ B62K 5/02 74/369 |

(Continued)

FOREIGN PATENT DOCUMENTS

| CN | 2209103 Y | 10/1995 |
| CN | 2365129 Y | 2/2000 |

(Continued)

OTHER PUBLICATIONS

English Translation of International Search Report date Jun. 21, 2016 for corresponding International Application No. PCT/CN2016/076416, filed Mar. 15, 2016.

*Primary Examiner* — Tony H Winner
(74) *Attorney, Agent, or Firm* — Westman, Champlin & Koehler, P.A.

(57) ABSTRACT

A directional transmission mechanism, a directional sprocket apparatus using the directional transmission mechanism, and a pedal device using the directional sprocket apparatus are disclosed. The directional transmission mechanism includes a driving shaft, an output shaft, a co-rotating wheel, a reverse-rotating wheel, and a switching mechanism. The co-rotating wheel set drives the output shaft to rotate in a direction that is the same as that of the driving shaft. The reverse-rotating wheel set drives the output shaft to rotate in a direction opposite to that of the driving shaft. The switching mechanism switches the driving shaft to drive the co-rotating wheel set or drive the reverse-rotating wheel set to rotate, so as to enable the output shaft to rotate (Continued)

directionally. The co-rotating wheel set is connected with the driving shaft and the output shaft, and the reverse-rotating wheel set is connected with the driving shaft and the output shaft.

20 Claims, 17 Drawing Sheets

Related U.S. Application Data continuation-in-part of application No. PCT/CN2016/076416, filed on Mar. 15, 2016.

(51) Int. Cl.
    *F16D 41/32*     (2006.01)
    *F16D 41/26*     (2006.01)
    *B62M 6/55*     (2010.01)
    *B62M 1/36*     (2013.01)
    *B62M 9/10*     (2006.01)
    *F16D 41/18*     (2006.01)
    *F16H 37/04*     (2006.01)
    *F16D 41/10*     (2006.01)

(52) U.S. Cl.
    CPC ........... *F16D 41/185* (2013.01); *F16D 41/26* (2013.01); *F16D 41/32* (2013.01); *F16D 41/36* (2013.01); *F16H 37/043* (2013.01); *F16D 41/10* (2013.01)

(56) References Cited

U.S. PATENT DOCUMENTS

| | | |
|---|---|---|
| 5,435,583 A | 6/1995 | Foster, Jr. |
| 2005/0014585 A1 | 1/2005 | Vaskas |
| 2010/0225087 A1 | 9/2010 | Brusca |
| 2011/0120794 A1 | 5/2011 | Höbel |
| 2012/0036959 A1 | 2/2012 | Chen |
| 2013/0327171 A1 | 12/2013 | Shu et al. |
| 2013/0340551 A1 | 12/2013 | Grandi |
| 2015/0159736 A1 | 6/2015 | Storti |
| 2016/0327102 A1* | 11/2016 | Chen ................ F16D 41/16 |
| 2016/0347414 A1 | 12/2016 | Niki |
| 2016/0362158 A1 | 12/2016 | Storti |
| 2017/0267024 A1* | 9/2017 | Peng ............... B60B 27/0026 |
| 2017/0349237 A1* | 12/2017 | Popper ................ B62M 11/06 |
| 2018/0170483 A1 | 6/2018 | Niki |
| 2019/0144073 A1* | 5/2019 | Kim ................ F16D 41/24 475/269 |

FOREIGN PATENT DOCUMENTS

| | | |
|---|---|---|
| CN | 201784788 U | 4/2011 |
| CN | 102490849 A | 6/2012 |
| CN | 202670038 U | 1/2013 |
| CN | 104494772 A | 4/2015 |
| CN | 105083462 A | 11/2015 |
| CN | 204846275 U | 12/2015 |

* cited by examiner

US 10,807,677 B2

DIRECTIONAL TRANSMISSION MECHANISM, DIRECTIONAL SPROCKET APPARATUS AND PEDAL DEVICE

CROSS REFERENCE TO RELATED APPLICATIONS

This is a divisional of U.S. application Ser. No. 15/597,924, filed on May 17, 2017 which published as U.S.P.A.P. No. 2017-0247083 A1 on Aug. 31, 2017, which is a continuation-in-part of International Application PCT/CN2016/076416, with an international filing date of Mar. 15, 2016, which International Application claims priorities from Patent Application No. 201510422426.0 filed in The People's Republic of China on Jul. 17, 2015, Patent Application No. 201520972479.5 filed in The People's Republic of China on Nov. 30, 2015, and Patent Application No. 201620057088.5 filed in The People's Republic of China on Jan. 20, 2016.

FIELD

The present invention relates to the field of transmission mechanisms and, more particularly, to a directional transmission mechanism for being attached as an add-on to an existing pedal device such as an existing bicycle, a directional sprocket apparatus using the directional transmission mechanism, and a pedal device using the directional sprocket apparatus.

BACKGROUND

In gear transmission apparatus, a driven wheel is usually connected with an output shaft, and a driving wheel meshes with the driven wheel directly or via an idle wheel, thereby changing a rotating speed, a torque, or a rotating direction of the output shaft relative to the driving wheel. In conventional gear transmission apparatus, when the rotating direction of the driving wheel changes, a direction of the output shaft changes correspondingly. In use of such gear transmission apparatus, a driving device for the driving wheel is required to have a determined rotating direction, and the rotating direction should be determined at the time the driving device is assembled. Once the driving device rotates reversely, the gear transmission apparatus may be damaged. In addition, sometimes when the driving device rotates reversely, the driving device may perform idle work, which decreases energy utilization efficiency.

SUMMARY

What is needed, therefore, is a directional transmission mechanism for being attached as an add-on to an existing pedal device such as an existing bicycle, which can solve the problem that the rotating direction of the output shaft of the conventional gear transmission apparatus changes along with the change of the rotating direction of the driving shaft.

In one aspect, a directional transmission mechanism for being attached as an add-on to an existing pedal device such as an existing bicycle is provided, which includes a driving shaft, an output shaft, a co-rotating wheel set for driving the output shaft to rotate in a direction that is the same as that of the driving shaft, a reverse-rotating wheel set for driving the output shaft to rotate in a direction opposite to that of the driving shaft, and a switching mechanism for switching the driving shaft to drive the co-rotating wheel set or the reverse-rotating wheel set to rotate, so as to enable the output shaft to rotate directionally. The co-rotating wheel set is connected with the driving shaft and the output shaft, and the reverse-rotating wheel set is connected with the driving shaft and the output shaft.

In embodiments of the present invention, the co-rotating wheel set is used to connect the driving shaft with the output shaft, and the reverse-rotating wheel set is used to connect the driving shaft with the output shaft at the same time. With the arrangement of the switching mechanism, the operation of the co-rotating wheel set or of the reverse-rotating wheel set is switched by the switching mechanism to ensure that the output shaft always rotates in the same direction, such that the output shaft realizes a directional output and does not change in direction with the change of the rotating direction of the driving shaft.

In another aspect, a directional sprocket apparatus for being attached as an add-on to an existing pedal device such as an existing bicycle is provided, which includes the aforementioned directional transmission mechanism, a slave transmission wheel for driving the driving shaft of the directional transmission mechanism to rotate, a master transmission wheel for driving the slave transmission wheel to rotate, a transmission shaft for supporting the master transmission wheel, and an output wheel connected with the output shaft.

The directional sprocket apparatus of the present invention uses the aforementioned directional transmission mechanism, such that the output shaft can always rotate in the same direction no matter whether the sprocket of the directional sprocket apparatus rotates forwardly or reversely.

In still another aspect, a pedal device is provided, which comprises a frame, the aforementioned directional sprocket apparatus, and a foot pedal for driving the transmission shaft of the directional sprocket apparatus to rotate. The transmission shaft is mounted on the frame. In particular, the pedal device is resulted by attaching the directional transmission mechanism as an add-on to an existing pedal device without modifying an original structure of the existing pedal device, the frame, the transmission shaft, the output wheel and the foot pedal are original parts of the existing pedal device, the transmission shaft of the directional sprocket apparatus is configured to be driven to rotate by the original foot pedal of the pedal device, and the output wheel of the directional sprocket apparatus is configured to drive an original sprocket wheel of a rear wheel of the existing pedal device to rotate forwardly.

The pedal device of the present invention uses the aforementioned directional sprocket apparatus. Therefore, when the foot pedal is pedaled forwardly, the pedal device can be driven to move forwardly, and when the foot pedal is pedaled reversely, the pedal device can still be driven to move forwardly. Thus, the pedal device has an improved driving efficiency and brings fun by providing a different riding experience.

DESCRIPTION OF THE EMBODIMENTS

Figure 1:
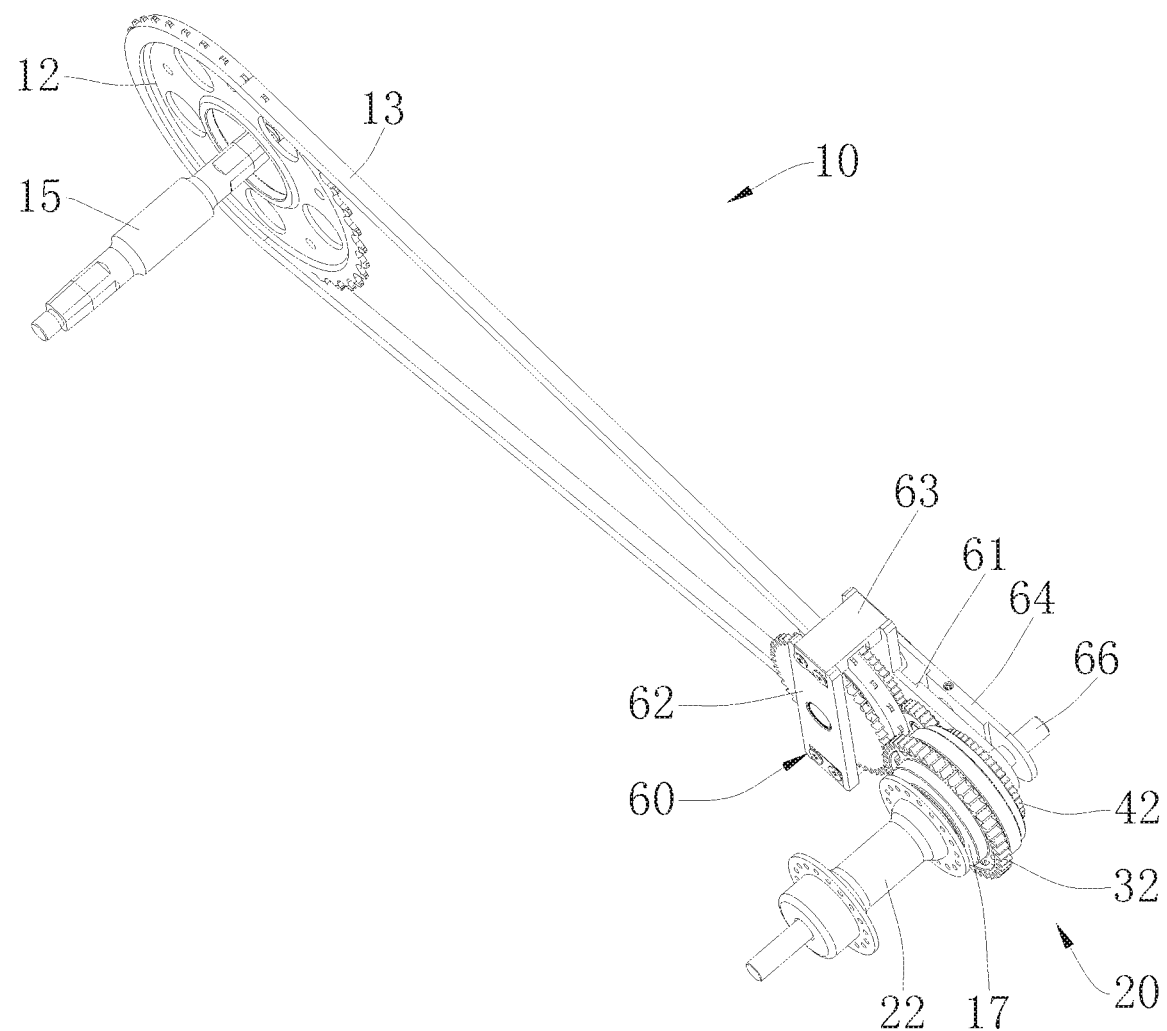
FIG. 1 is a perspective schematic view of a directional sprocket apparatus provided by a first embodiment of the present invention.
Figure 2:
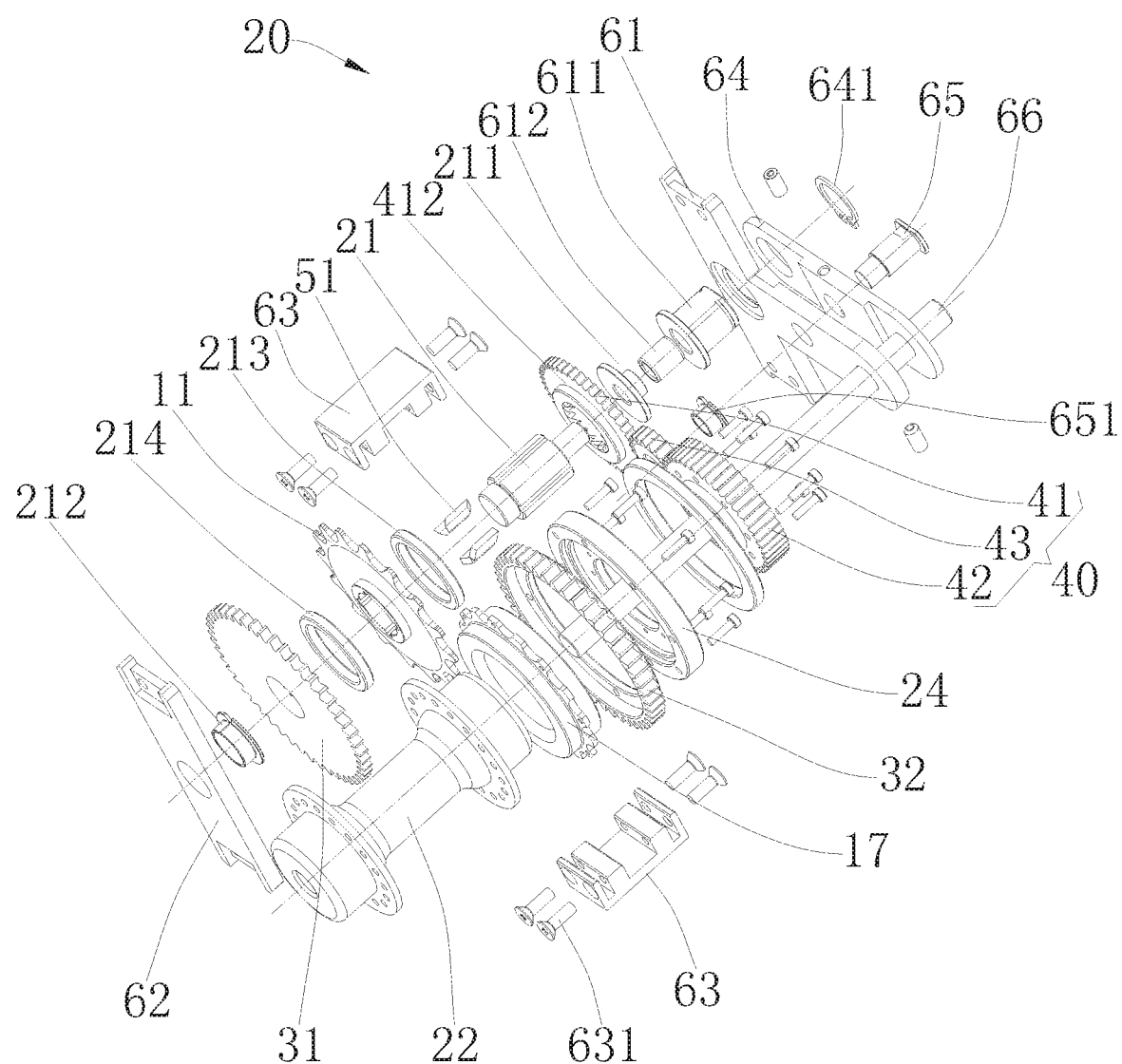
FIG. 2 is an exploded schematic view of the directional transmission mechanism of the directional sprocket device of FIG. 1.
Figure 3:
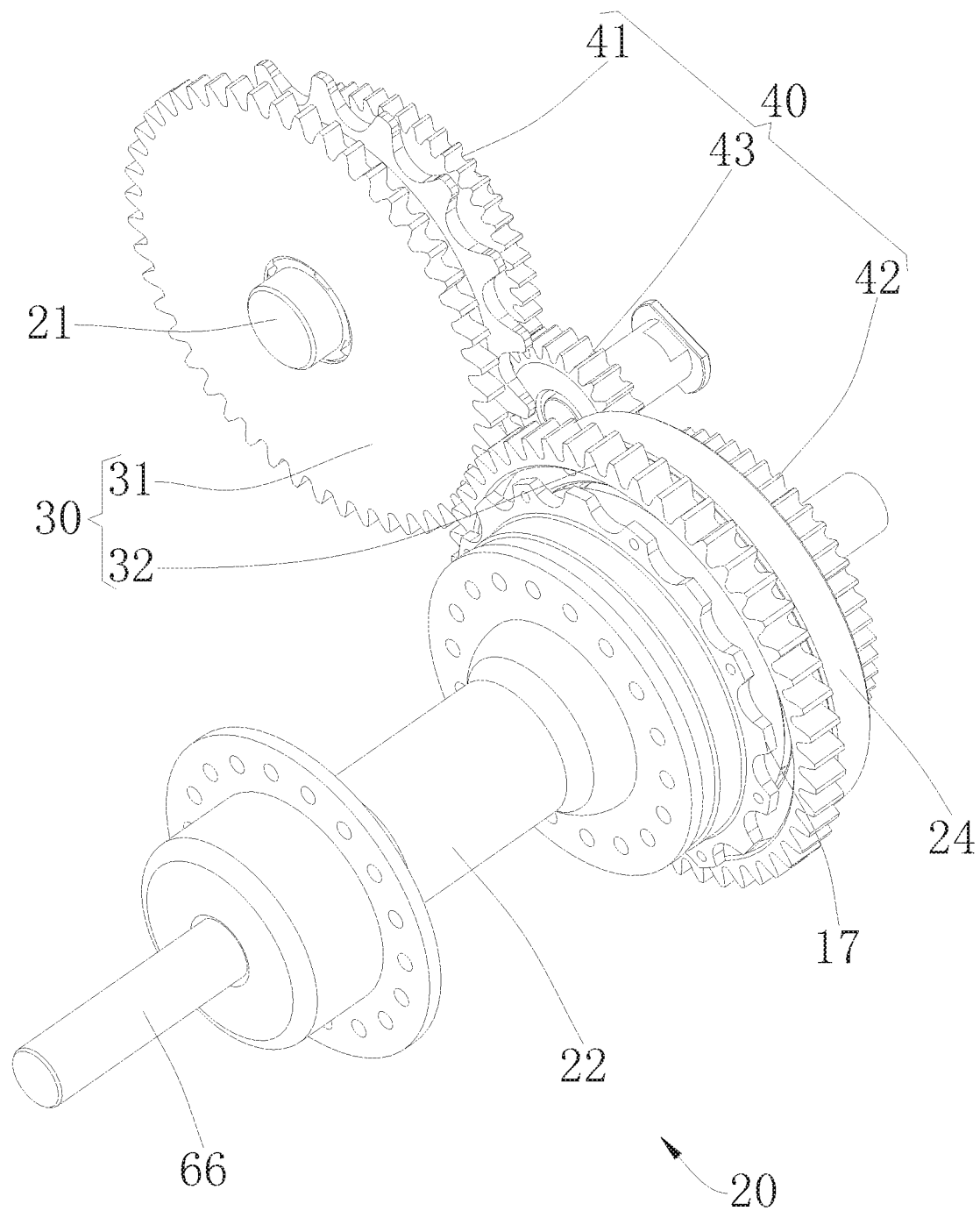
FIG. 3 is an assembled view of an interior structure of the directional transmission mechanism of FIG. 2.
Figure 4:
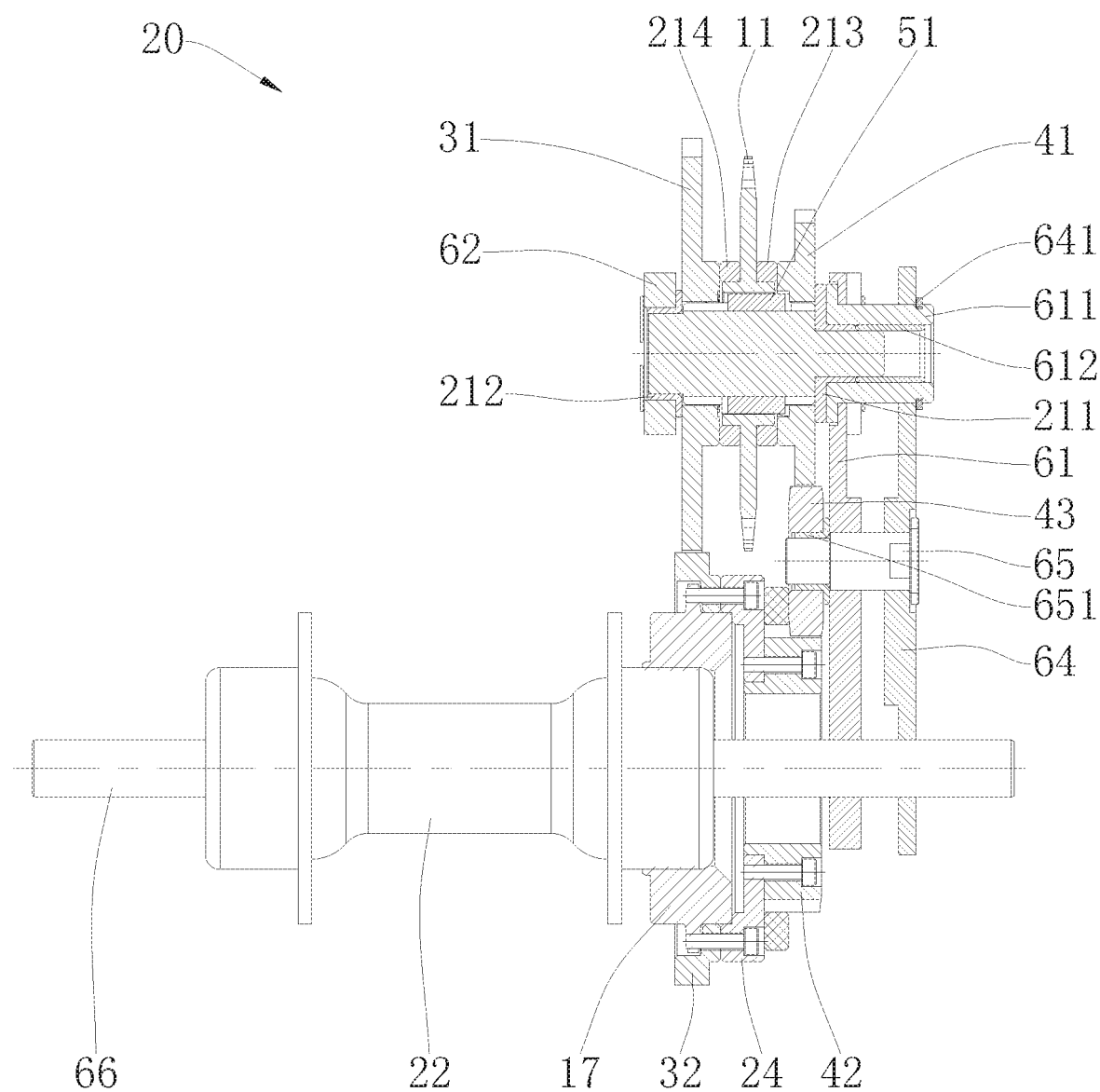
FIG. 4 is a sectional view of the directional transmission mechanism of FIG. 3.
Figure 5:
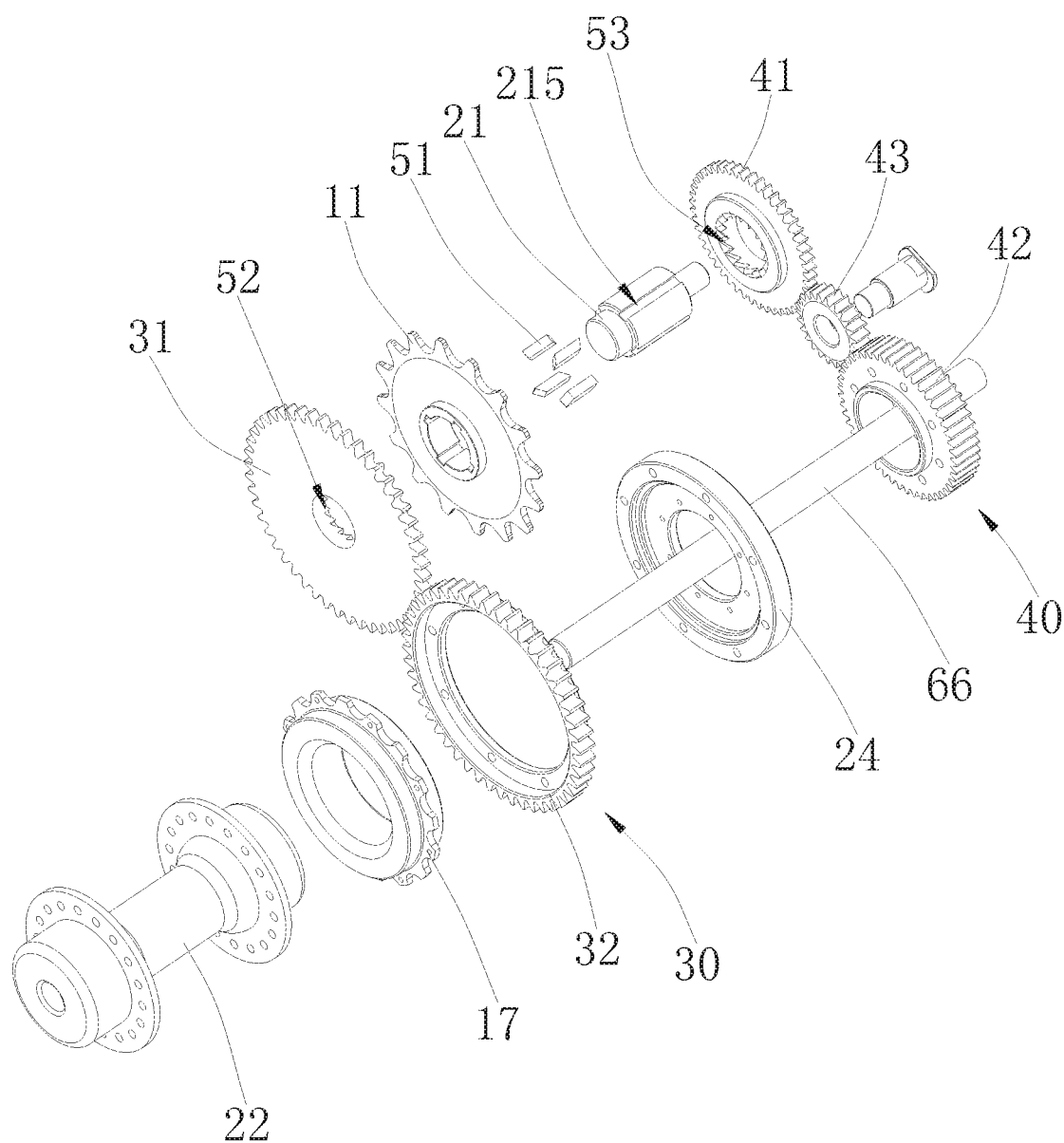
FIG. 5 is an exploded view of the directional transmission mechanism of FIG. 3.
Figure 6:
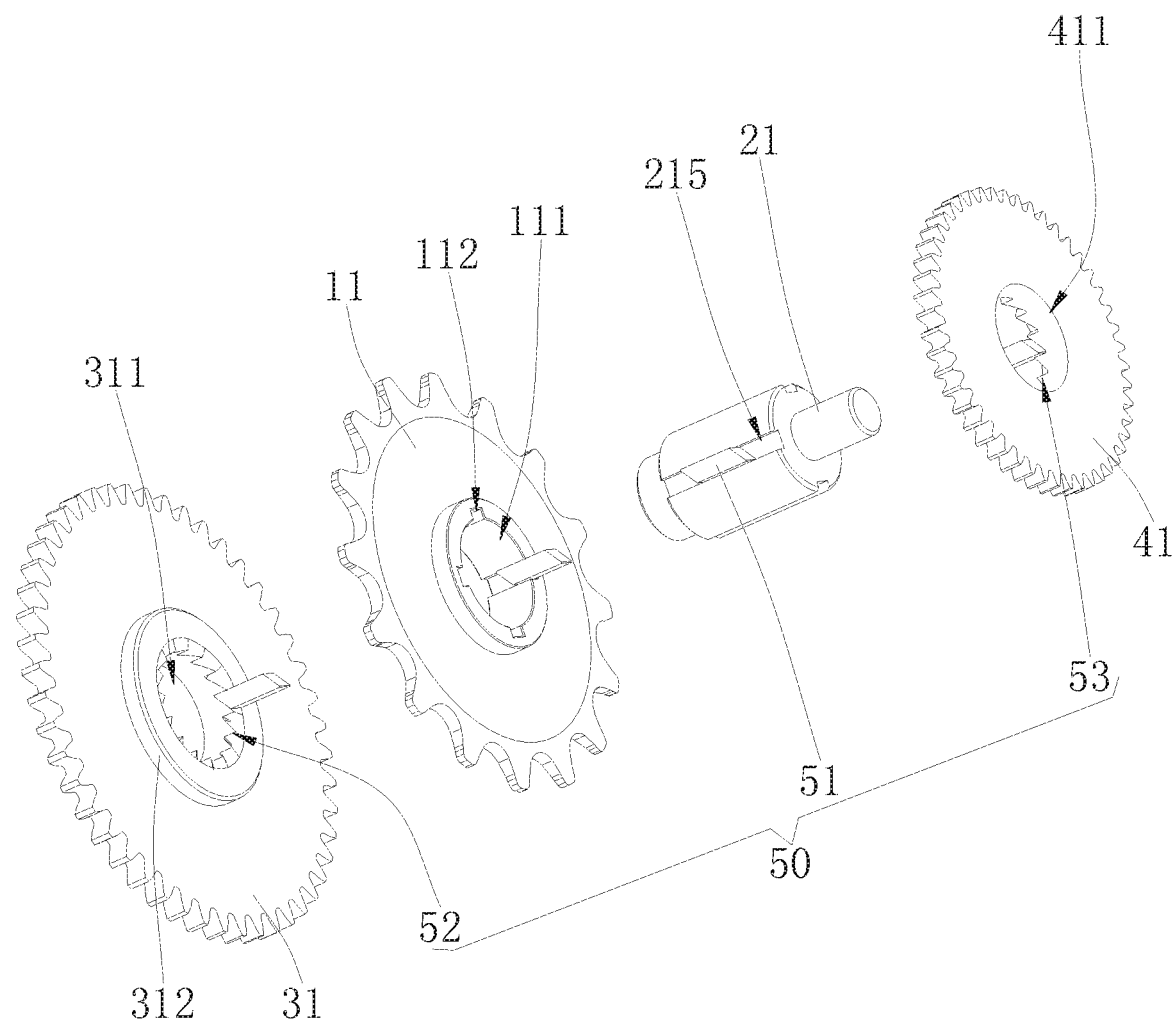
FIG. 6 is a schematic view of a switching operation of a switching mechanism of the directional transmission mechanism of FIG. 3.

In order to make the purposes, technical solutions, and advantages of the present invention clearer, the present invention will be further described in detail hereinafter with reference to accompany drawings and embodiments. It should be understood that the specific embodiments described here are only intended to illustrate the present invention, but not to limit the present invention.

First Embodiment

Please refer to FIG. 1 to FIG. 6, a directional sprocket apparatus 10 provided by this embodiment of the present invention comprises a master transmission wheel 12, a transmission chain 13, a directional transmission mechanism 20, a slave transmission wheel 11, a transmission shaft 15, and an output wheel 17. Both the master transmission wheel 12 and the slave transmission wheel 11 are sprocket wheels. The transmission chain 13 is fittingly connected with the master transmission wheel 12 and the slave transmission wheel 11, the slave transmission wheel 11 is connected with the directional transmission mechanism 20, the output wheel 17 is used to output power, and the master transmission wheel 12 is mounted on and supported by the transmission shaft 15. When the transmission shaft 15 rotates, it drives the master transmission wheel 12 to rotate synchronously.

Please refer to FIG. 2 to FIG. 6, the directional transmission mechanism 20 includes a driving shaft 21, an output shaft 22, a co-rotating wheel set 40, a reverse-rotating wheel set 30, and a switching mechanism 50. The co-rotating wheel set 40 connects the driving shaft 21 and the output shaft 22, such that when the driving shaft 21 drives the co-rotating wheel set 40 to rotate so as to drive the output shaft 22 to rotate, the driving shaft 21 and the output shaft 22 can rotate in the same direction. The reverse-rotating wheel set 30 connects the driving shaft 21 and the output shaft 22, such that when the driving shaft 21 drives the reverse-wheel set 30 to rotate so as to drive the output shaft 22 to rotate, the driving shaft 21 and the output shaft 22 can rotate in directions opposite to each other. The switching mechanism 50 is used to switch the driving shaft 21 to drive the co-rotating wheel set 40 to rotate or drive the reverse-rotating wheel set 30 to rotate. Thus, regardless of a forward rotation or a reverse rotation of the driving shaft 21, the output shaft 22 can rotate in the same direction, without changing in direction along with direction change of the driving shaft 21.

In this embodiment, the slave transmission wheel 11 of the directional sprocket apparatus 10 is connected with the driving shaft 21 so as to drive the driving shaft 21 to rotate. The directional sprocket apparatus 10 uses the aforementioned directional transmission mechanism 20, and in the directional transmission mechanism 20, regardless of a forward rotation or a reverse rotation of the driving shaft 21, the output shaft 22 can rotate in the same direction, without changing in direction along with direction change of the driving shaft 21 Thus, whether the sprockets of the directional sprocket apparatus 10 rotate forwardly or reversely, the output shaft 22 can always rotate in the same direction. The output wheel 17 is mounted on the output shaft 22, such that the output wheel 17 is driven to rotate to output power when the output shaft 22 rotates.

In this embodiment, the directional transmission mechanism 20 is applied in the directional sprocket apparatus 10. In other embodiments, the directional transmission mechanism 20 can also be applied in other transmission mechanisms, and can further be used as a gear box. If the directional transmission mechanism 20 is connected with a driving motor, and the driving shaft 21 of the directional transmission mechanism 20 is driven by the driving motor to rotate, the output shaft can rotate in the same direction, regardless of a forward rotation or a reverse rotation of the driving motor. Thus, the mounting of the driving motor can be facilitated. Furthermore, when the driving motor rotates reversely, it can still output normally via the directional transmission mechanism 20, so that the energy utilization efficiency can be improved by making full use of the driving motor. The directional transmission mechanism 20 can also be conveniently attached to various devices, such as common bicycles, multi-wheel vehicles, crawler vehicles, ships, generators, etc, such that the driving shaft, regardless of forward rotation or reverse rotation thereof, can always drive an associated device to move or rotate forwardly Please refer to FIG. 2, FIG. 4, FIG. 5, and FIG. 6, in particular, the switching mechanism 50 includes first meshing teeth 52, second meshing teeth 53, and a sliding member. The first meshing teeth 52 are configured to drive the reverse-rotating wheel set 30 to rotate, and the second meshing teeth 53 are configured to drive the co-rotating wheel set 40 to rotate. The sliding member is slidably mounted on the driving shaft 21, and is configured to be fittingly connected selectively with the first meshing teeth 52 or the second meshing teeth 53, so as to drive the reverse-rotating wheel set 30 or the co-rotating wheel set 40 to rotate. One end of the sliding member has a toothed configuration for meshing with the first meshing teeth 52, and the other end of the sliding member has a toothed configuration for meshing with the second meshing teeth 53. The driving shaft 21 is provided thereon with a sliding groove 215 for guiding the sliding member to slide back and forth between the first meshing teeth 52 and the second meshing teeth 53. By the sliding of the sliding member on the driving shaft 21, when the sliding member is moved to mesh with the first meshing teeth 52, the reverse-rotating wheel set 30 can be driven to rotate; when the sliding member is moved to mesh with the second meshing teeth 53, the co-rotating wheel set 40 can be driven to rotate.

In this embodiment, the sliding member is a sliding block 51, which is slidably mounted in the sliding groove 215. The sliding groove 215 is defined along an axial direction of the driving shaft 21. Both the first meshing teeth 52 and the second meshing teeth 53 are ratchet teeth, and a ratchet orientation of the first meshing teeth 52 is opposite to a ratchet orientation of the second meshing teeth 53. Two ends of the sliding block 51 are provided with ratchet teeth that mesh with the first meshing teeth 52 and the second meshing teeth 53, respectively. Please refer to FIG. 6, a detailed description is provided with reference to left and right directions in FIG. 6. It is noted, however, that the reference to the left and right directions here is only intended to illustrate conveniently with respect to FIG. 6, rather than to limit the directions of various structural components that are actually used. The ratchet tooth at a left end of the sliding block 51 and the first meshing teeth 52 form a reverse ratchet mechanism, and the ratchet tooth at a right end of the sliding block 51 and the second meshing teeth 53 form a forward ratchet mechanism. When the driving shaft rotates reversely, the sliding block 51 is acted by the ratchet teeth of the second meshing teeth 53 so as to be pushed away, such that the sliding block 51 moves along the sliding groove 215 to the first meshing teeth 52 and meshes with the first meshing teeth 52. Under the drive of the driving shaft 21, the reverse-rotating wheel set 30 is driven to rotate, which in turn drives the output shaft 22 to rotate in a direction opposite to that of the driving shaft 21. At the same time, the second meshing teeth 53 are separated from the sliding block 51, such that the co-rotating wheel set 40 does not drive the output shaft 22 to rotate. When the driving shaft 21 rotates forwardly, the action of the ratchet teeth of the first meshing teeth 52 pushes the sliding block 51 to move away, such that the sliding block 51 moves along the sliding groove 215 to the second meshing teeth 53 and meshes with the second meshing teeth 53. At the same time, the first meshing teeth 52 are separated from the sliding block 51, such that the reverse-rotating wheel set 30 does not drive the output shaft 22 to rotate any more. Since the ratchet orientation of the first meshing teeth 52 is opposite to the ratchet orientation of the second meshing teeth 53, after meshing with the second meshing teeth 53, the slide block 51 can drive the second meshing teeth 53 to rotate, which in turn drives the co-rotating wheel set 40 to rotate, such that the output shaft 22 is driven to rotate in the same direction as that of the driving shaft 21. This structure can realize an automatic switching between driving the co-rotating wheel set 40 and driving the reverse-rotating wheel set 30 to rotate using the driving shaft 21, which is simple in structure and convenient in manufacture.

Further, there are a plurality of sliding blocks 51, and there are also provided with a plurality of corresponding sliding grooves 215, so as to perform the transmission better. Furthermore, each sliding block 51 can have a cross section in the shape of a parallelogram, which is simple and convenient in manufacture.

In this embodiment, the directional transmission mechanism 20 is applied in the directional sprocket apparatus 10, the slave transmission wheel 11 is mounted at a middle part of the driving shaft 21, and the co-rotating wheel set 40 and the reverse-rotating wheel set 30 are respectively arranged at opposite sides of the slave transmission wheel 11. The slave transmission wheel 11 defines a through hole 111 fitting with the driving shaft 21. A groove 112 is formed in the through hole 111, corresponding to each sliding groove 215. Each sliding block 51 protrudes out of the sliding groove 215 and extends into the corresponding groove 112 in a radial direction of the driving shaft 21. Thus, when the slave transmission wheel 11 rotates, it can drive the driving shaft 21 to rotate via the sliding blocks 51.

Further, in order to make the slave transmission wheel 11 not contact the co-rotating wheel set 40 and the reverse-rotating wheel set 30 directly, a first spacer ring 213 is disposed between the slave transmission wheel 11 and the co-rotating wheel set 40, and a second spacer ring 214 is disposed between the slave transmission wheel 11 and the reverse-rotating wheel set 30. In addition, abrasion between the slave transmission wheel 11 and the co-rotating wheel set 40 and between the slave transmission wheel 11 and the reverse-rotating wheel set 30 can be reduced.

In some other embodiments, the slave transmission wheel 11 can also be fixedly connected with an end of the driving shaft 21, and the co-rotating wheel set 40 and the reverse-rotating wheel set 30 are arranged at the same side of the slave transmission wheel 11.

In other embodiments, both the first meshing teeth 52 and the second meshing teeth 53 are ratchet teeth, and a ratchet orientation of the first meshing teeth 52 is opposite to a ratchet orientation of the second meshing teeth 53. The sliding member can also be a sliding sleeve, and two ends of the sliding sleeve have toothed configurations for respectively engaging with the first meshing teeth 52 and the second meshing teeth 53. When the sliding sleeve meshes with the first meshing teeth 52, under the drive of the driving shaft 21, the reverse-rotating wheel set 30 is driven to rotate. As a result, under the drive of the reverse-rotating wheel set 30, the output shaft 22 is driven to rotate in a direction opposite to that of the driving shaft. When the driving shaft 21 reverses, the first meshing teeth 52 reverse too and push the sliding sleeve to move away at the same time, such that the sliding sleeve moves along the sliding groove 215 to the second meshing teeth 53 and meshes with the second meshing teeth 53. At the same time, the first meshing teeth 52 are separated from the sliding sleeve, such that the reverse-rotating wheel set 30 does not drive the output shaft 22 to rotate any more. Since the ratchet orientation of the first meshing teeth 52 is opposite to the ratchet orientation of the second meshing teeth 53, after meshing with the second meshing teeth 53, the sliding sleeve can drive the second meshing teeth 53 to rotate, which in turn drives the co-rotating wheel set 40 to rotate, such that the output shaft 22 is driven to rotate in the same direction as that of the driving shaft 21. This structure can also realize an automatic switching between driving the co-rotating wheel set 40 and driving the reverse-rotating wheel set 30 to rotate using the driving shaft 21.

In this embodiment, the co-rotating wheel set 40 and the reverse-rotating wheel set 30 are arranged at two ends of the driving shaft 21 respectively, and the sliding member is arranged between the co-rotating wheel set 40 and the reverse-rotating wheel set 30.

In some other embodiments, the first meshing teeth 52 and the second meshing teeth 53 can also be common gear teeth, and the sliding member can also be a sliding sleeve. Two ends of the sliding groove have toothed configurations. The sliding groove 215 on the driving shaft 21 is configured to have a spiral shape, and the sliding sleeve is provided therein with a projection inserted in the sliding groove 215. When the driving shaft 21 rotates forwardly, the projection is driven to move along the sliding groove 215. At the same time, under the drive of the projection, the sliding sleeve rotates along with the driving shaft 21, until the sliding sleeve meshes with the first meshing teeth 52 or the second meshing teeth 53. When the provided spiral groove rotates forwardly along with the driving shaft 21 and the projection moves towards the co-rotating wheel set 40, the driving shaft 21 drives the sliding sleeve to connect with the second meshing teeth 53, thereby driving the co-rotating wheel set 40 to rotate. When the driving shaft 21 rotates reversely, it drives the sliding sleeve to move towards the reverse-rotating wheel set 30 so as to connect the sliding sleeve with the first meshing teeth 52, thereby driving the reverse-rotating wheel set 30 to rotate. This structure can also realize an automatic switching between driving the co-rotating wheel set 40 and driving the reverse-rotating wheel set 30 to rotate.

Of course, a travel of the sliding sleeve can also be determined by a length of the spiral sliding groove 215. In some other embodiments, when the spiral sliding groove 215 is arranged on the driving shaft 21 to drive and guide the sliding sleeve to move, an end of the sliding groove can be provided with external teeth, and the co-rotating wheel set 40 and the reverse-rotating wheel set 30 can be provided with corresponding internal teeth for engaging with the external teeth. In this case, the co-rotating wheel set 40 and the reverse-rotating wheel set 30 can be arranged at the same side of the driving shaft 21, and the sliding sleeve is driven to move by the driving shaft 21, so as to connect the sliding sleeve selectively with the co-rotating wheel set 40 or with the reverse-rotating wheel set 30.

In other embodiments, manual switching can also be used. For example, a pushing piece and a meshing block can be mounted on the driving shaft 21, and the meshing block is pushed to move using the pushing piece, such that the meshing block is connected selectively with the co-rotating wheel set 40 or the reverse-rotating wheel set 30, thereby achieving manual switching.

Please refer to FIG. 3, FIG. 4, FIG. 5, and FIG. 6, the reverse-rotating wheel set 30 includes a first master gear 31 and a first slave gear 32. A center of the first master gear 31 is provided with a first shaft hole 311 for fitting with the driving shaft 21, the first master gear 31 is attached around the driving shaft 21, and the first meshing teeth 52 are arranged on the first master gear 31. The first slave gear 32 is connected with the output shaft 22, and the first slave gear 32 meshes with the first master gear 31. By means of the engagement of the first slave gear 32 with the first master gear 31, the first slave gear 32 rotates in a direction opposite to that of the first master gear 31, so as to drive the output shaft 22 to rotate in a direction opposite to that of the driving shaft 21. In this embodiment, the reverse-rotating wheel set 30 has only two gears, which has a simple structure and low cost. When the reverse-rotating wheel set 30 includes an even number of gears meshing sequentially, it can be ensured that the foremost gear and the aftermost gear rotate in directions opposite to each other, such that the output shaft 22 can be driven to rotate in a direction opposite to that of the driving shaft 21. Therefore, in other embodiments, the reverse-rotating wheel set 30 can include an even number of gears meshing sequentially, the foremost gear is the first master gear 31, and the aftermost gear is the first slave gear 32 connected with the output shaft 22.

Further, a side of the first master gear 31 close to the sliding member is provided with a first cam 312, and the first meshing teeth 52 are arranged on a side of the first cam 312 away from the first master gear 31. In this embodiment, the first meshing teeth 52 are arranged in the first shaft hole 311, and the first meshing teeth 52 are arranged at an end of the first shaft hole 311 close to the reverse-rotating wheel set 30. This structure is simple in manufacture and is compact. In addition, with the arrangement of the first cam 312, the strength of the first master gear 31 can be improved. In other embodiments, the first meshing teeth 52 can also be arranged on a side surface of the first cam 312 close to the sliding member. In this embodiment, the first cam 312 and the first master gear 31 are formed integrally and have high strength. In other embodiments, the first cam 312 and the first master gear 31 can also be made separately, and then the first cam 312 is fixedly connected with the first master gear 31.

Further, the co-rotating wheel set 40 includes a second master gear 41, a second slave gear 42, and an idle gear 43. A center of the second master gear 41 is provided with a second shaft hole 411 for fitting with the driving shaft 21, the second master gear 41 is attached around the driving shaft 21, and the second meshing teeth 53 are arranged on the second master gear 41. The second slave gear 42 is connected with the output shaft 22 and arranged to be spaced from the second master gear 41, and the idle gear 43 operatively meshes the second master gear 41 and the second slave gear 42. With the idle gear 43 operatively meshing the second master gear 41 and the second slave gear 42, the second master gear 41 rotates in a direction opposite to that of the idle gear 43, and the idle gear 43 rotates in a direction opposite to that of the second slave gear 42, such that the second slave gear 42 rotates in the same direction as that of the second master gear 41, thereby driving the output shaft 22 to rotate in the same direction as that of the driving shaft 21. In this embodiment, the co-rotating wheel set 40 has only three gears, which has a simple structure and low cost. When the co-rotating wheel set 40 includes an odd number of gears meshing sequentially, it can be ensured that the foremost gear and the aftermost gear rotate in the same direction, such that the output shaft 22 can be driven to rotate in the same direction as that of the driving shaft 21. Therefore, in other embodiments, the co-rotating wheel set 40 can include an odd number of gears meshing sequentially, the foremost gear is the second master gear 41, the aftermost gear is the second slave gear 42 connected with the output shaft 22, and an odd number of intermediate gears are idle gears 43.

Further, a side of the second master gear 41 close to the sliding member is provided with a second cam 412, and the second meshing teeth 53 are arranged on a side of the second cam 412 away from the second master gear 41. In this embodiment, the second meshing teeth 53 are arranged in the second shaft hole 411, and the second meshing teeth 53 are arranged at an end of the second shaft hole 411 close to the co-rotating wheel set 40. This structure is simple in manufacture and is compact. In addition, with the arrangement of the second cam 412, the strength of the second master gear 41 can be improved. In other embodiments, the second meshing teeth 53 can also be arranged on a side surface of the second cam 412 close to the sliding member.

In this embodiment, the second cam 412 and the second master gear 41 are formed integrally and have high strength. In other embodiments, the second cam 412 and the second master gear 41 can also be made separately, and then the second cam 412 is fixedly connected with the second master gear 41.

Further, in this embodiment, the first master gear 31 and the first slave gear 32 have the same module and tooth number and equal center distances, and the second master gear 41 and the second slave gear 42 have the same module and tooth number and equal center distances. Thus, regardless of forward rotating or reverse rotating, the driving shaft 21 and the output shaft 22 always rotate at the same speed. Of course, the first master gear 31 and the first slave gear 32, or the second master gear 41 and the second slave gear 42 can also adopt different tooth numbers and a different gear ratio.

Further, please refer to FIG. 1, FIG. 2, FIG. 3, and FIG. 4, the directional transmission mechanism 20 further includes a support frame 60 configured to support the driving shaft 21, the co-rotating wheel set 40, the reverse-rotating wheel set 30, and the output shaft 22. With the support frame 60 to support the driving shaft 21, the co-rotating wheel set 40, the reverse-rotating wheel set 30, and the output shaft 22, the directional transmission mechanism 20 can be assembled better, which facilitates assembly and use of the directional transmission mechanism 20.

In particular, the support frame 60 includes a first support plate 61, a second support plate 62, and a connecting block 63 connecting the first support plate 61 with the second support plate 62. Two ends of the driving shaft 21 are respectively pivotably connected to the first support plate 61 and the second support 62, and the output shaft 22 is pivotably connected to the first support plate 61.

Further, there are two connecting blocks 63, which are respectively arranged at upper and lower sides of the first support plate 61, and two ends of each connecting block 63 are respectively connected with the first support plate 61 and the second support plate 62 via screws 631.

Further, the support frame 60 includes a support shaft 65 supporting the idle gear 43. The support shaft 65 is connected with the first support plate 61, and the idle gear 43 is pivotably connected on the support shaft 65. Further, in order to support the support shaft 65 better to ensure smooth rotation of the idle gear 43, the support frame 60 further includes a third support plate 64. The third support plate 64 and the first support plate 61 are located at the same end of the driving shaft 21, and the driving shaft 21 is pivotably connected on the third support plate 64. Thus, the support shaft 65 can be supported via the third support plate 64 and the first support plate 61. Further, in order to enable the idle gear 43 to rotate on the support shaft 65 more agilely, a sliding bushing 651 is further attached around a part of the support shaft 65 corresponding to the idle gear 43.

In this embodiment, in order to better mount the first master gear 31 and the second master gear 41 at two ends of the driving shaft 21 and to prevent the first master gear 31 and the second master gear 41 from falling off, two ends of the driving shaft 21 are respectively received in a first abutting sleeve 211 and in a second abutting sleeve 212. The first abutting sleeve 211 is located at a side of the second master gear 41 away from the first master gear 31, and the second abutting sleeve 212 is located at a side of the first master gear 31 away from the second master gear 41.

Further, in order to better mount the first support plate 61 and the third support plate 64 on the driving shaft 21, the support frame 60 further includes a positioning sleeve 611. The positioning sleeve 611 is attached around the driving shaft 21, and the first support plate 61 and the third support plate 64 are mounted on the positioning sleeve 611. The first support plate 61 and the third support plate 64 can be connected with the positioning sleeve 611 via an inference fit. Further, in order to prevent the third support plate 64 from falling off the positioning sleeve 611, a clamping ring 641 can be used to clamp the third support plate 64 on the positioning sleeve 611. Further, in order to enable the driving shaft 21 to rotate in the positioning sleeve 611 more agilely, a shaft sleeve 612 is further mounted in the positioning sleeve 611 to reduce a friction force applied on the driving shaft 21.

Further, in this embodiment, the directional sprocket apparatus 10 can be conveniently attached to an existing pedal device and, therefore, the directional transmission mechanism 20 can also be conveniently attached to the pedal device. In this case, the output shaft 22 can be a rear wheel hub of the pedal device, an end of the output shaft 22 is connected with the first slave gear 32, the second slave gear 42 is connected with the first slave gear 32, and the driving shaft 21 is connected with the first support plate 61 via a mandrel. In other embodiments, when the directional transmission mechanism 20 is applied in other devices, the first slave gear 32 and the second slave gear 42 can be directly mounted on the output shaft 22.

Further, the directional transmission mechanism 20 further includes a connecting plate 24 connected with the second slave gear 42 and the first slave gear 32, and the second slave gear 42 and the first slave gear 32 are respectively arranged at two sides of the connecting plate 24. The arrangement of the connecting plate 24 separates the second slave gear 42 from the first slave gear 32, so as to prevent the second slave gear 42 and the first slave gear 32 from affecting each other, and facilitate mounting of the co-rotating wheel set 40 and the reverse-rotating wheel set 30.

Further, in this embodiment, the output wheel 17 is a flywheel, an end of the output shaft 22 is connected with the output wheel 17, and the output wheel 17 is connected with the co-rotating wheel set 40 or the reverse-rotating wheel set 30. With the arrangement of the flywheel, when the driving shaft 21 is stationary, it can be ensured that the output shaft 22 rotates normally. In this embodiment, the output wheel 17 is fixed on the connecting plate 24. The output wheel 17 is arranged at a side of the first slave gear 32 away from the second slave gear 42. The output wheel 17 is driven to rotate by the co-rotating wheel set 40 or the reverse-rotating wheel set 30, which in turn drives the output shaft 22 to rotate so as to output power. In other embodiments, the co-rotating wheel set 40 and the reverse-rotating wheel set 30 can also be directly connected with the output shaft 22.

Further, in this embodiment, the output shaft 22 can be a rear wheel shaft sleeve of a bicycle, and the directional sprocket apparatus 10 further includes a fixing shaft 66 supporting the rear wheel shaft sleeve. The fixing shaft 66 is mounted on a rear wheel of the bicycle to support the output shaft 22.

Please refer to FIG. 1, the embodiment of the present invention further discloses a pedal device, which includes a frame, the aforementioned directional sprocket apparatus 10, and a foot pedal for driving the transmission shaft 15 of the directional sprocket apparatus 10 to rotate. The transmission shaft 15 is mounted on the frame. It is particularly noted that, with respect to an existing bicycle, only the directional transmission mechanism 20 is required to be attached to the bicycle; both the transmission shaft 15 and the output shaft 22 can be original components of the bicycle, and an original structure of the bicycle needs not to be modified. The pedal device (such as the bicycle) uses the aforementioned directional sprocket apparatus 10. Therefore, when the foot pedal is pedaled forwardly, the pedal device can be driven to move forwardly and, when the foot pedal is pedaled reversely, the pedal device can also be driven to move forwardly. The directional sprocket apparatus 10 may further include a flywheel, such that when the foot pedal of the pedal device is not pedaled, the pedal device can still be moved forward or backward.

Second Embodiment

Please refer to FIG. 7 to FIG. 12, a directional sprocket apparatus 10b of this embodiment, which can be attached as an add-on to an existing pedal device such as an existing bicycle, differs from the directional sprocket apparatus of the first embodiment in that: the directional sprocket apparatus 10b of this embodiment includes a transmission shaft 15b, a speed-adjusting wheel set 16b, a driving gear 19b, an output wheel 17b, a directional transmission mechanism 20b, a master transmission wheel 12b, a slave transmission wheel 11b, and a transmission chain 13b; both the master transmission wheel 12b and the slave transmission wheel 11b are sprocket wheels, the transmission chain 13b fittingly connects the master transmission wheel 12b with the slave transmission wheel 11b, the slave transmission wheel 11b is connected with the directional transmission mechanism 20b, the main transmission wheel 12b is mounted on the transmission shaft 15b, such that the transmission shaft 15b, when rotating, drives the master transmission wheel 12b to rotate, which in turn drives the slave transmission wheel 11b and the directional transmission wheel 20b to rotate via the transmission chain 13; the output wheel 17b is connected with the directional transmission mechanism 20b, such that the directional transmission mechanism 20b, when rotating, drives the output wheel 17b to rotate; moreover, no matter whether a direction of rotation transmitted from the transmission wheel 11b is forward or reverse, the rotation can be transformed by the directional transmission mechanism 20b such that the output wheel 17b rotates in the same direction; the driving gear 19b is coaxially connected with the speed-adjusting wheel set 16b, and the speed-adjusting wheel set 16b is driven to rotate by the driving gear 19b to output power; the speed-adjusting wheel set 16b is attached around the transmission shaft 15b and can rotate on the transmission shaft 15b, such that the speed-adjusting wheel set 16b is supported by the transmission shaft 15b, which makes the directional sprocket apparatus 10b more compact in structure; the output wheel 17b is a gear, and the driving gear 19b meshes with the output wheel 17b, such that when the directional transmission means 20b drives the output wheel 17b to rotate, the output wheel 17b can drive the driving gear 19b to rotate, which in turn drives the speed-adjusting wheel set 16b to rotate to thereby output power.

The speed-adjusting wheel set 16b is rotatably mounted on the transmission shaft 15b, the master transmission wheel 12b is fixedly mounted on the transmission shaft 15b, the directional transmission mechanism 20b, the slave transmission wheel 11b, the driving gear 19b, and the output wheel 17b are arranged, and the master transmission wheel 12b is connected with the slave transmission wheel 11b via the transmission chain 13b. Whether the transmission shaft 15b rotates forwardly or reversely, its rotation can be transformed by the directional transmission mechanism 20b into the same direction in which the output wheel 17b is driven to rotate, and the output wheel 17b in turn drives the speed-adjusting wheel set 16b to always rotate in the same direction. Thus, it is ensured that the transmission shaft 15b and the master transmission wheel 12b, whether rotating forwardly or reversely, can enable the output wheel 17b and the speed-adjusting wheel set 16b to output directionally.

Figure 7:
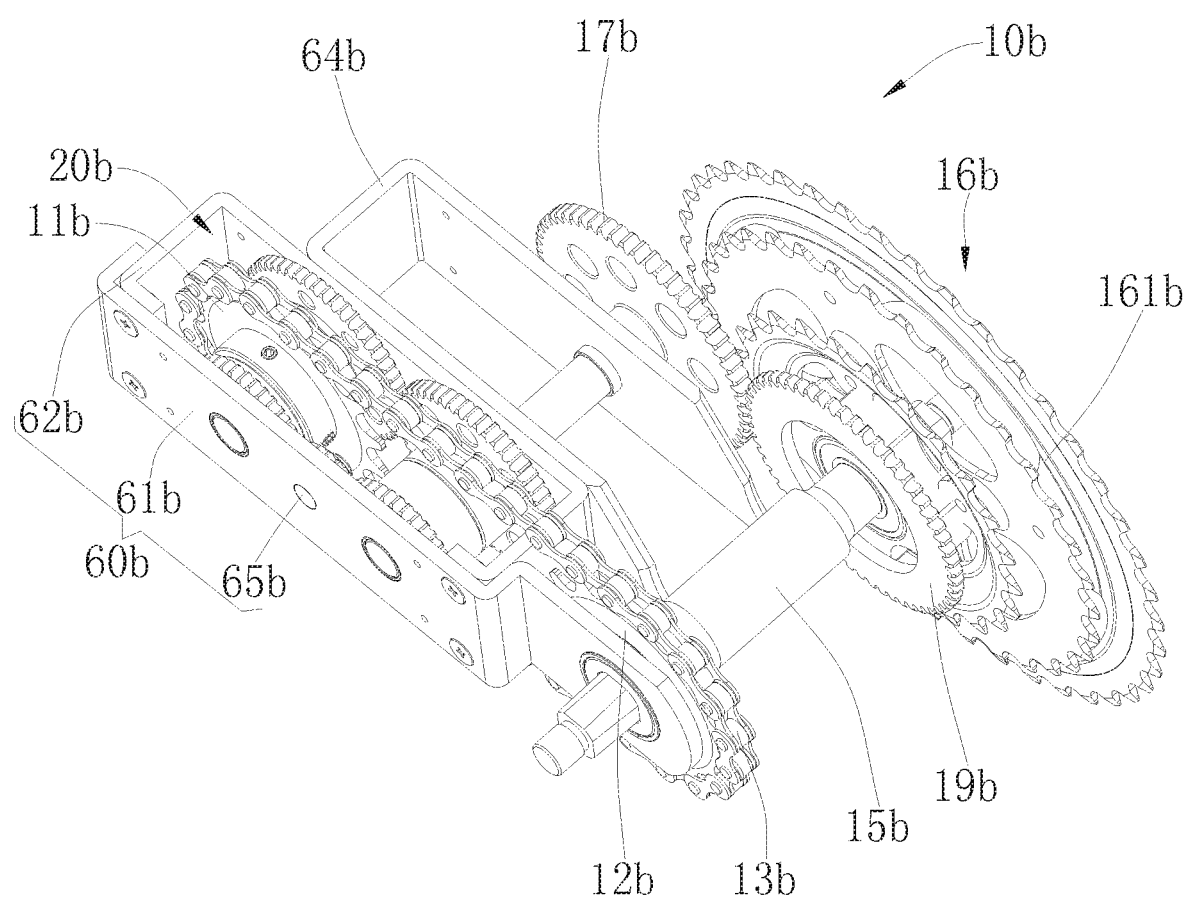
FIG. 7 is a perspective schematic view of a directional sprocket transmission apparatus provided by a second embodiment of the present invention.
Figure 8:
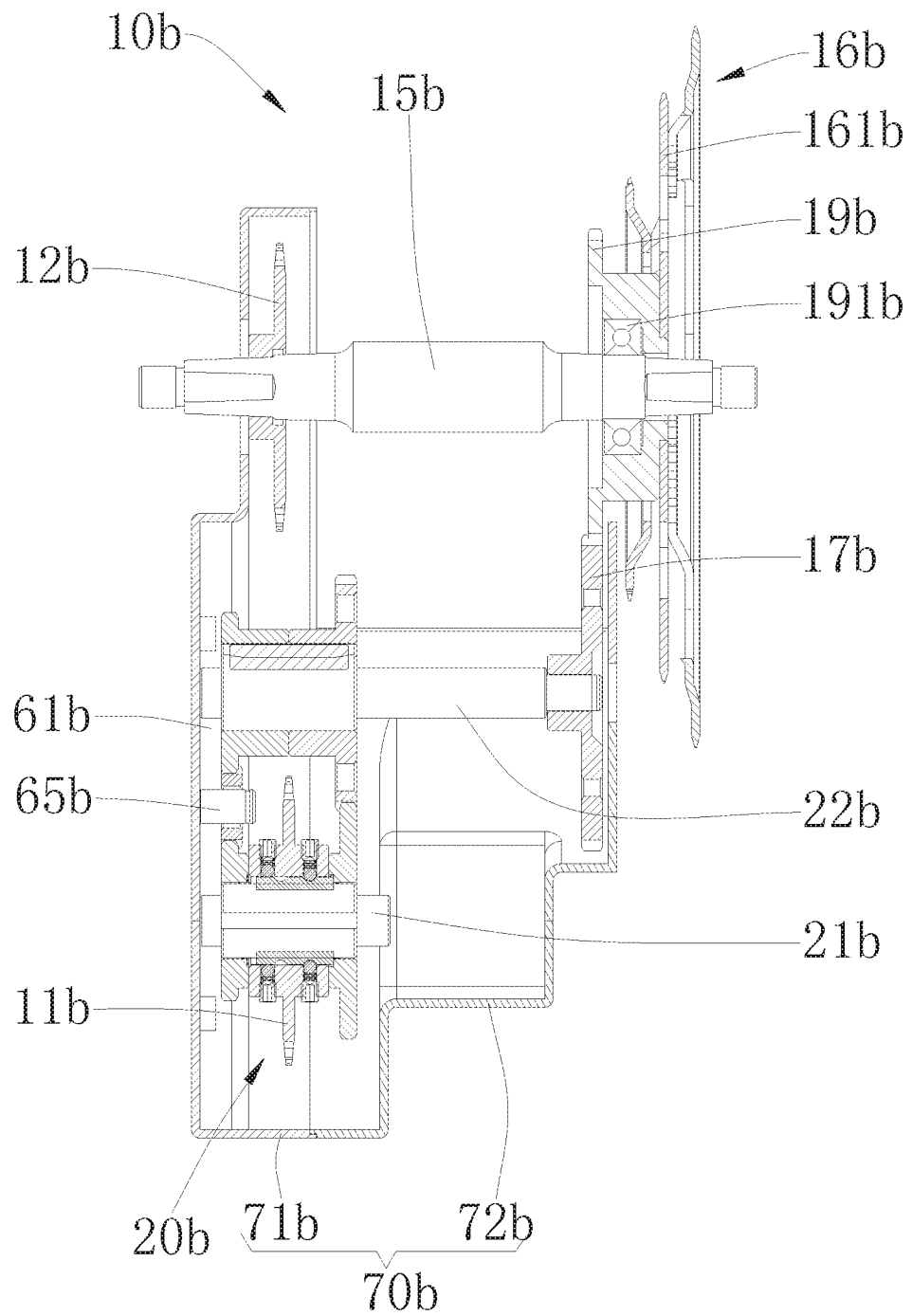
FIG. 8 is a sectional view of the directional sprocket transmission apparatus of FIG. 7.
Figure 11:
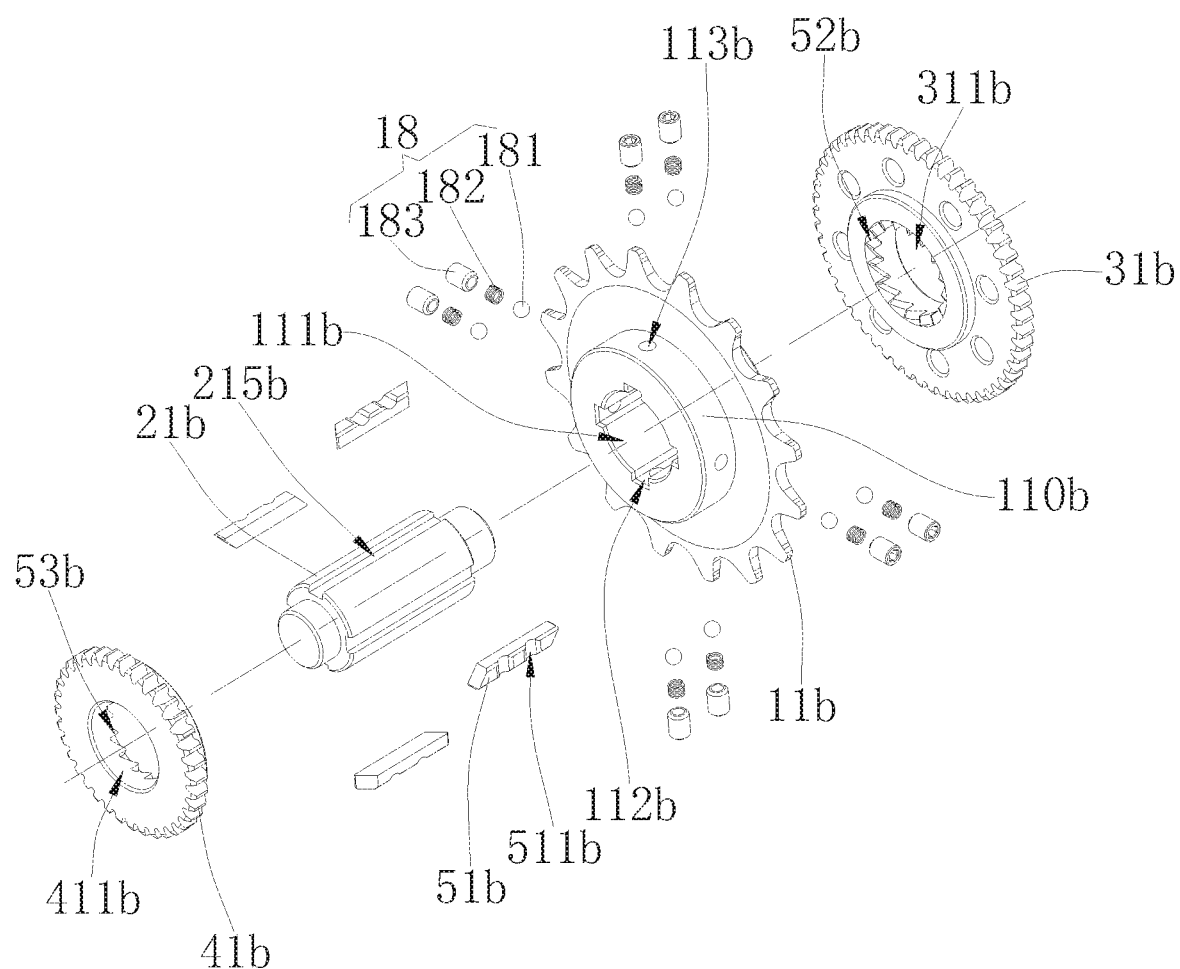
FIG. 11 is an exploded view of the switching mechanism of FIG. 10, with a first master gear and a second master gear also shown.

Please refer to FIG. 7, FIG. 8, and FIG. 11, the directional transmission mechanism 20b includes a driving shaft 21b, an output shaft 22b, a co-rotating wheel set 40b, a reverse-rotating wheel set 30b, and a switching mechanism 50b. The co-rotating wheel set 40b is connected with the driving shaft 21b and the output shaft 22b, such that when the driving shaft 21b drives the co-rotating wheel set 40b to rotate so as to drive the output shaft 22b to rotate, the driving shaft 21b and the output shaft 22b can rotate in the same direction. The reverse-rotating wheel 30b is connected with the driving shaft 21b and the output shaft 22b, such that when the diving shaft 21b drives the reverse-rotating wheel set 30b to rotate so as to drive the output shaft 22b to rotate, the driving shaft 21b and the output shaft 22b can rotate in directions opposite to each other. The switching mechanism 50b is used to switch the driving shaft 21b to drive the co-rotating wheel set 40b to rotate or drive the reverse-rotating wheel set 30b to rotate. As a result, whether the driving shaft 21b rotates forwardly or reversely, the output shaft 22b can always rotate in the same direction, without changing in direction along with the change of the rotating direction of the driving shaft 21b, thereby achieving a directional transmission. The slave transmission wheel 11b is mounted on the driving shaft 21b, and the output wheel 17b is mounted on the driving shaft 22b, such that rotation of the transmission shaft 15b can be transmitted to the driving shaft 21b for the directional transmission mechanism 20b to change a direction of the rotation and drive the output wheel 17b to rotate, thereby outputting power to the speed-adjusting wheel set 16b.

Please refer to FIG. 8, FIG. 10, FIG. 11, and FIG. 12, further, the switching mechanism 50b includes first meshing teeth 52b, second meshing teeth 53b, and a plurality of sliding blocks 51b. The first meshing teeth 52b are used to drive the reverse-rotating wheel set 30b to rotate, and the second meshing teeth 53b are used to drive the co-rotating wheel set 40b to rotate. Both the first meshing teeth 52b and the second meshing teeth 53b are ratchet teeth, and an orientation of the first meshing teeth 52b is opposite to an orientation of the second meshing teeth 53b. The sliding blocks 51b are slidably mounted on the driving shaft 21b, and are used to fittingly connect with the first meshing teeth 52b or the second meshing teeth 53b, so as to drive the reverse-rotating wheel set 30b or the co-rotating wheel set 40b to rotate. One end of each sliding block 51b is used to mesh with the first meshing teeth 52b, and the other end of each sliding block 51b is used to mesh with the second meshing teeth 53b. The driving shaft 21b is provided thereon with a plurality of sliding groove 215b for guiding the sliding blocks 51b to slide back and forth between the first meshing teeth 52b and the second meshing teeth 53b.

Further, the directional transmission mechanism 10b includes a connecting sleeve 110b, and the slave transmission wheel 11b is fixed on the connecting sleeve 110b. By the arrangement of the connecting sleeve 110b, the sliding blocks 51b can be constrained on the driving shaft 21b, so as to prevent the sliding blocks 51b from falling off. Further, the connecting sleeve 110b defines a through hole 111b for fitting with the driving shaft 21b, and grooves 112b are formed in a sidewall defining the through hole 111b, corresponding to the sliding grooves 215b. Each sliding block 51b protrudes out of one corresponding sliding groove 215b and extends into one corresponding groove 112*b* along a radial direction of the driving shaft 21*b*.

In this embodiment, the slave transmission wheel 11*b* is fixed on the connecting sleeve 110*b*, such that the slave transmission wheel 11*b* drives the connecting sleeve 110*b* to rotate, which in turn drives the driving shaft 21*b* to rotate. Further, the slave transmission wheel 11*b* and the connecting sleeve 110*b* can be formed integrally, so as to facilitate manufacture thereof. In other embodiments, the slave transmission wheel 11*b* can also be directly fixed on the driving shaft 21*b*.

Figure 12:
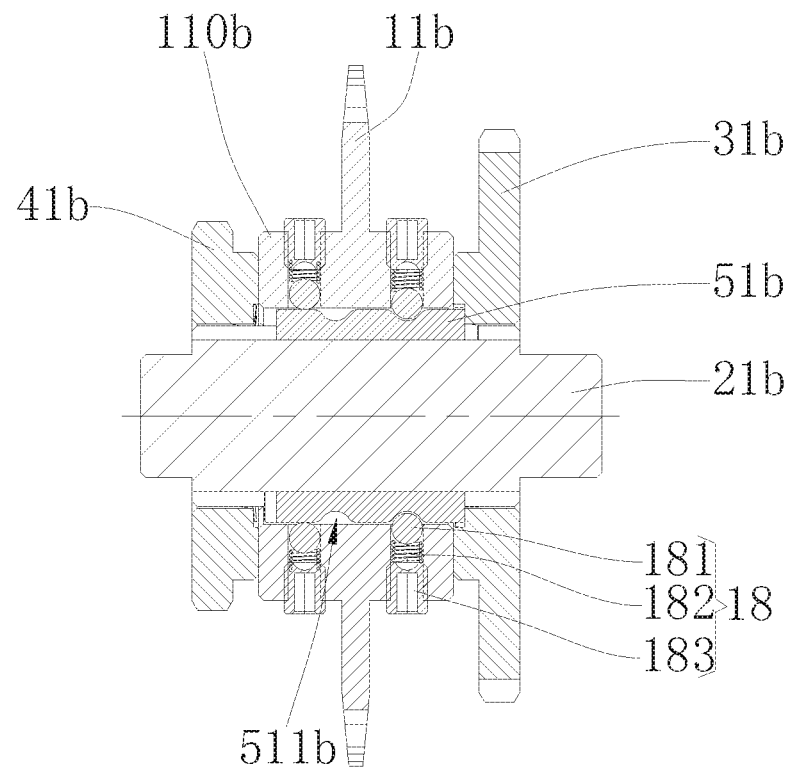
FIG. 12 is a sectional view of the switching mechanism, the first master gear, and the second master gear of FIG. 10 which are assembled.

Please refer to FIG. 12, a detailed description is provided with reference to left and right directions in FIG. 12. It is noted, however, that the reference to the left and right directions here is only intended to illustrate conveniently with respect to FIG. 12, rather than to limit the directions of various structural components that are actually used. A left end of the sliding blocks 51*b* and the first meshing teeth 52*b* form a reverse ratchet mechanism, and a right end of sliding blocks 51*b* and the second meshing teeth 53*b* form a forward ratchet mechanism. When the driving shaft 21*b* rotates forwardly, the sliding blocks 51*b* are acted by bevels of the second meshing teeth 53*b* and slide rightwards, so as to separate from the second meshing teeth; afterwards, the sliding blocks 51*b* mesh with the first meshing teeth 52*b* to drive the reverse-rotating wheel set 30*b* to rotate. Under the drive of the reverse-rotating wheel set 30*b*, the output shaft 22*b* is driven to rotate in a direction opposite to that of the driving shaft 21*b*. When the driving shaft 21*b* rotates reversely, the sliding block 51*b* are acted by bevels of the first meshing teeth 52*b* and slide leftwards, the sliding blocks 51*b* separate from the first meshing teeth 52*b* and then mesh with the second meshing teeth 53*b*, and the reverse-rotating wheel set 30*b* does not drive the output shaft 22*b* to rotate any more. Since the orientation of the first meshing teeth 52*b* is opposite to the orientation of the second meshing teeth 53*b*, after the sliding blocks 51*b* mesh with the second meshing teeth 53*b*, they can drive the second meshing teeth 53*b* to rotate, which in turn drive the co-rotating wheel set 40*b* to rotate, which in turn drives the output shaft 22*b* to rotate in the same direction as that of the driving shaft 21*b*. This structure can realize an automatic switching between driving the co-rotating wheel set 40*b* and driving the reverse-rotating wheel set 30*b* to rotate according to a rotating direction of the driving shaft 21*b*, which is simple in structure, convenient to manufacture, and reliable in movement. There is a plurality of the sliding blocks 51*b*, and there is also a plurality of the corresponding sliding grooves 215*b*, so as to perform the transmission better. Furthermore, each sliding block 51*b* can have a cross section in the shape of a parallelogram, which is simple and convenient in manufacture.

In this embodiment, the co-rotating wheel set 40*b* and the reverse-rotating wheel set 30*b* are rotatably mounted on two ends of the driving shaft 21*b* respectively, and the sliding blocks 51*b* are arranged between the co-rotating wheel set 40*b* and the reverse-rotating wheel set 30*b*.

Please refer to FIG. 8, FIG. 10, FIG. 11, and FIG. 12, further, openings 113*b* are defined in two ends of the connecting sleeve 110*b*, corresponding to the grooves 112*b*. An elastic positioning assembly 18 is mounted in each opening 113*b*, and two ends of each sliding block 51*b* are provided with positioning grooves 511*b* engaging with the elastic positioning assemblies 18. When the elastic positioning assemblies 18 extend into their respective positioning grooves 511*b*, the elastic positioning assemblies 18 can position their respective sliding blocks 51*b*. In such a structural design, when the sliding blocks 51*b* mesh with the first meshing teeth 52*b*, the elastic positioning assemblies 18 on the connecting sleeve 110*b* at a side of the slave transmission wheel 11*b* position the sliding blocks 51*b*, which can prevent the sliding blocks 51*b* from becoming disengaged from the first meshing teeth 52*b*, so as to better drive the reverse-rotating wheel set 30*b* to rotate. When the driving shaft 21*b* reverses, under the pushing of the first meshing teeth 52*b*, the sliding blocks 51*b* move towards the second meshing teeth 53*b*. When the sliding blocks 51*b* mesh with the second meshing teeth 53*b*, the elastic positioning assemblies 18 on the connecting sleeve 110*b* at another side of the slave transmission wheel 11*b* can generate an axial elastic positioning moment, which can elastically position the sliding blocks 51*b* while allowing the sliding blocks 51*b* to slide axially when subjected to a great axial force.

Further, each elastic positioning assembly 18 includes a ball 181, a spring 182, and a locking block 183, and the ball 181, the spring 182, and the locking block 183 are sequentially mounted in a corresponding opening 113*b*. The ball 181 and the locking block 183 are respectively located at two ends of the spring 182. The spring 182 pushes the ball 181 towards the sliding block 51*b*. When the ball 181 enters the positioning groove 511*b* of the sliding block 51*b*, it can position the sliding block 51*b*. When the sliding block 51*b* slides on the driving shaft 21*b*, the ball 181 can be received in the opening 113*b*. The positioning block 183 is mounted in the opening 113*b*, and can prevent the spring 182 from falling out of the opening 113*b*. In this embodiment, the locking block 183 can be a nut, which is simple in structure and convenient to mount. In other embodiments, the elastic positioning assembly 18 can also be an elastic extendable rod.

Figure 9:
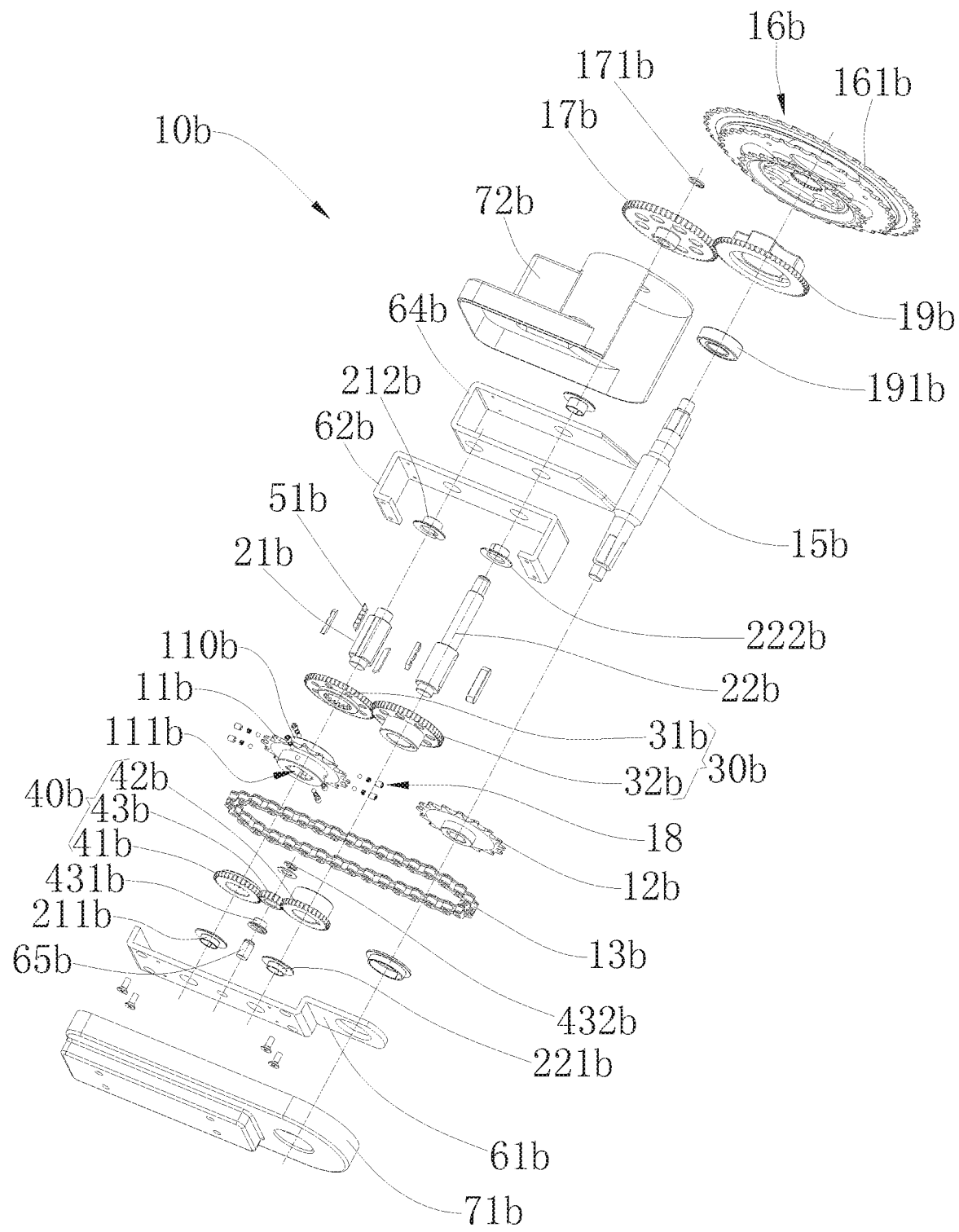
FIG. 9 is an exploded view of the directional sprocket transmission means of FIG. 7.
Figure 10:
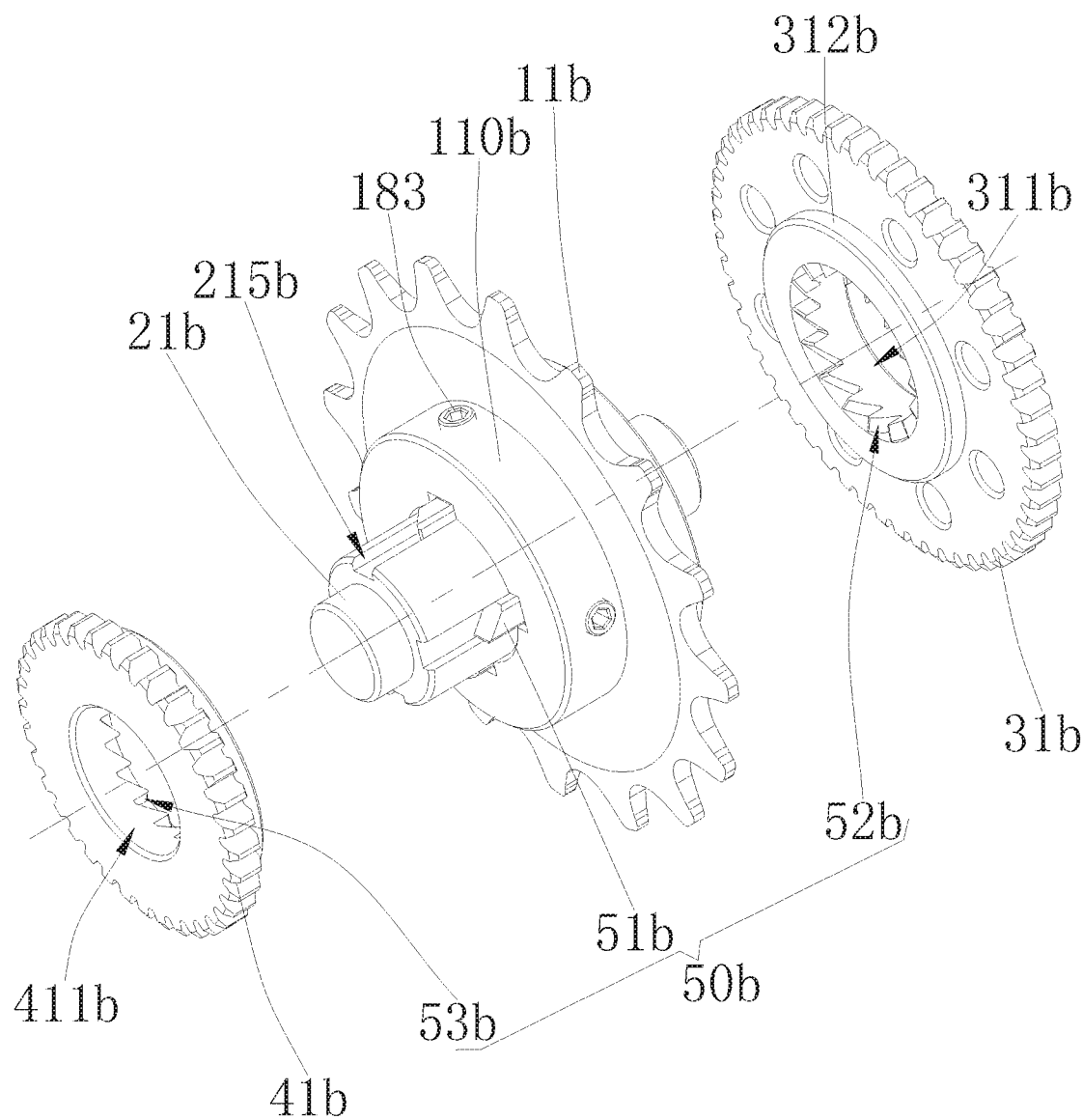
FIG. 10 is an exploded view of a switching mechanism, a first master gear, and a second master gear of the directional transmission mechanism of the directional sprocket transmission apparatus of FIG. 7.

Further, please refer to FIG. 7, FIG. 8. FIG. 9, and FIG. 10, the directional sprocket apparatus 10*b* further include a support frame 60*b* configured to support the driving shaft 21*b*, the co-rotating wheel set 40*b*, the reverse-rotating wheel set 30*b*, the transmission shaft 15*b*, and the output shaft 22*b*. By arranging the support frame 60*b* to support the driving shaft 21*b*, the co-rotating wheel set 40*b*, the reverse-rotating wheel set 30*b*, the transmission shaft 15*b*, and the output shaft 22*b*, the directional transmission mechanism 20*b* can be assembled better, so as to facilitate assembly and use of the directional transmission mechanism 20*b*.

The support frame 60*b* includes a first support plate 61*b* and a second support plate 62*b*. The second support plate 62*b* is U-shaped and has two ends connected with the first support plate 61*b*. The driving shaft 21*b*, the output shaft 22*b*, and the transmission shaft 15*b* are supported via the first support plate 61*b* and the second support plate 62*b*, which facilitates assembly of the directional sprocket apparatus 10.

The directional sprocket apparatus 10*b* further includes a U-shaped frame 64*b*. One side of the U-shaped frame 64*b* is connected with a middle part of the second support plate 62*b*, and the U-shaped frame 64*b* is located at a side of the second support frame 62*b* away from the first support frame 61*b*. One end of the driving shaft 21 runs through two end portions of the U-shaped frame 64*b* and is connected with the output wheel 17*b*, and the output wheel 17*b* and the directional transmission mechanism 20*b* are respectively located at two sides of the U-shaped frame 64*b*. With the arrangement of the U-shaped frame 64*b*, a width of the directional sprocket apparatus 10*b* can be adjusted, so as to facilitate mounting the directional sprocket apparatus 10*b* on a frame of a pedal device such as a bicycle, thus facilitating the mount and use of the directional sprocket apparatus 10b in various pedal devices.

Furthermore, the directional sprocket apparatus 10b further includes a protection cover 70. The protection cover 70 covers the directional transmission mechanism 20b, the master transmission wheel 12b, the slave transmission wheel 11b, and the output wheel 17b, so as to not only protect the directional transmission mechanism 20b, the master transmission wheel 12b, the slave transmission wheel 11b, and the output wheel 17b, but also protect personal safety by preventing people from accessing to the directional transmission mechanism 20b, the master transmission wheel 12b, the slave transmission wheel 11b, and the output wheel 17b. The protection cover 70b includes a first cover 71b and a second cover 72b that are locked with each other, so as to facilitate manufacture of the protection cover 70 and assembly of various components.

Further, the support frame 60b further includes a support shaft 65b for supporting an idle gear 43b. The support shaft 65b is connected with the first support plate 61b, and the idle gear 43b is pivoted on the support shaft 65b. Further, in order to protect the idle gear 43b, a shaft sleeve 431b is attached around the support shaft 65b, and the idle gear 43b is mounted on the shaft sleeve 431b. In order to prevent the idle gear 431b from falling off, a first clamping ring 432b is mounted on the support shaft 65b. Similarly, in order to prevent the output wheel 17b from falling off, a second clamping ring 171b is mounted on the output shaft 22b.

In this embodiment, in order to better mount the first master gear 31b and the second master gear 41b on two ends of the driving shaft 21b and prevent the first master gear 31b and the second master gear 41b from falling off, two ends of the driving shaft 21b are respectively received in a first support sleeve 211b and a second support sleeve 212b. The first support sleeve 211b is located at a side of the second master gear 41b away from the first master gear 31b, and the second support sleeve 212b is located at a side of the first master gear 31b away from the second master gear 41b. Similarly, in order to better mount the first slave gear 32b and the second slave gear 42b on the output shaft 22b, a first blocking sleeve 221b and a second blocking sleeve 222b are mounted on the driving shaft 22b. The first blocking sleeve 221b is located at a side of the second slave gear 42b away from the first slave gear 32b, and the second blocking sleeve 222b is located at a side of the first slave gear 32b away from the second slave gear 42b. With the first blocking sleeve 221b and the second blocking sleeve 222b abutting against the second driven gear 42b and the first driven gear 32b, the first slave gear 32b and the second slave gear 42b are blocked from moving on the output shaft 22b.

Further, in order to enable the driving gear 19b to agilely rotate on the transmission shaft 15b, a support bearing 191b is mounted on the transmission shaft 15b, and the driving gear 19b is mounted on the support bearing 191b.

Further, the speed-adjusting wheel set 16b includes a plurality of output sprocket wheels 161b. The output sprocket wheels 161b are arranged coaxially, and diameters of the output sprocket wheels 161b decrease gradually along an axial direction of the transmission shaft 15b. With this structural design, different output sprocket wheels 161b can be used to output at different rotation speed ratios during use, so as to realize a speed-adjusting function. In this embodiment, the diameters of the plurality of output sprocket wheels 161b increase gradually in a direction from a middle part of the transmission shaft 15b towards an end of the transmission shaft 15b away from the directional transmission mechanism 20b. In other embodiments, the diameters of the plurality of output sprocket wheels 161b decrease gradually in a direction from the end of the transmission shaft 15b away from the directional transmission mechanism 20 towards the middle part of the transmission shaft 15b. In this embodiment, there are three output sprocket wheels 161b; in other embodiments, there can also be more output sprocket wheels 161b.

Other structures of the directional sprocket apparatus 10b of this embodiment are similar to other structures of the directional sprocket apparatus of the first embodiment, explanations of which are therefore not repeated herein.

Please refer to FIG. 7, an embodiment of the present invention further discloses a pedal device, which comprises a frame, the aforementioned directional sprocket apparatus 10b, and foot pedals mounted at two ends of the transmission shaft 15b, respectively. The transmission shaft 15b is mounted on the frame. It is particularly noted that: with respect to an existing bicycle, only the directional transmission mechanism is required to be attached to the bicycle; both the transmission shaft 15b and the output sprocket wheels 16b can be original components of the bicycle, and an original structure of the bicycle needs not to be modified. This pedal device (such as the bicycle) uses the aforementioned directional sprocket apparatus 10b. Therefore, when the foot pedals are pedaled forwardly, the pedal device can be driven to move forwardly; when the foot pedals are pedaled reversely, the pedal device can also be driven to move forwardly. In addition, since it is realized that both forward and reverse rotations of the transmission shaft can drive the output shaft to rotate forwardly, the pedal device has an improved driving efficiency and brings fun by providing a different riding experience.

The pedal device can be a device requiring a unidirectional rotation operation, such as a bicycle, a pedal boat, a pedal generator, and so on.

Third Embodiment

Please refer to FIG. 13 to FIG. 17, a directional sprocket apparatus 10c of this embodiment, which can be attached as an add-on to an existing pedal device such as an existing bicycle, differs from the directional sprocket apparatus of the first embodiment in that: the directional sprocket apparatus 10c includes a transmission shaft 15c, a speed-adjusting wheel set 16c, a driving sprocket wheel 19c, an output wheel 17c, a directional transmission mechanism 20c, a master transmission wheel 12c, a slave transmission wheel 11c, and a driving chain 192c; the output wheel 17c is a sprocket wheel, both the master transmission wheel 12c and the slave transmission wheel 11c are gears, the master transmission wheel 12c meshes with the slave transmission wheel 11c, the master transmission wheel 12c is mounted on the transmission shaft 15c, and the slave transmission wheel 11c is connected with the directional transmission mechanism 20c; when the transmission shaft 15c rotates, it drives the master transmission wheel 12c to rotate, which in turn drives the slave transmission wheel 11c and the directional transmission mechanism 20c to rotate; the output wheel 17c is connected with the directional transmission mechanism 20c, such that the directional transmission mechanism 20c, when rotating, can drive the output wheel 17c to rotate; In addition, whether a direction of rotation transmitted from the transmission wheel 11c is forward or reverse, the rotation can be transformed by the directional transmission mechanism 20c such that the output wheel 17c rotates in the same direction; the driving sprocket wheel 19c is coaxially connected with the speed-adjusting wheel set 16c, such that the speed-adjusting wheel set 16c is driven by the driving sprocket wheel 19c to rotate so as to output power; the speed-adjusting wheel set 16c is attached around the transmission shaft 15c, and can rotate on the transmission shaft 15c, such that the speed-adjusting wheel set 16c is supported by the transmission shaft 15c, which makes the directional sprocket apparatus 10c more compact in structure; the driving chain 192c is fittingly connected with the driving sprocket wheel 19c and the output wheel 17c, such that when the directional transmission mechanism 20c drives the output wheel 17c to rotate, the output wheel 17c can drive the driving sprocket wheel 19c to rotate via the driving chain 192c, which in turn drives the speed-adjusting wheel set 16c to rotate to thereby output power.

The speed-adjusting wheel set 16c is rotatably mounted on the transmission shaft 15c, the master transmission wheel 12c is fixedly mounted on the transmission shaft 15c, the directional transmission mechanism 20c, the slave transmission wheel 11c, the driving sprocket 19c, and the output wheel 17c are arranged, and the master transmission wheel 12c drives the slave transmission wheel 11c to rotate. Whether the transmission shaft 15c rotates forwardly or reversely, its rotation can be transformed by the directional transmission mechanism 20c into the same direction in which the output wheel 17c is driven to rotate, and the output wheel 17c in turn drives the speed-adjusting wheel set 16c to always rotate in the same direction. Thus, it is ensured that the transmission shaft 15c, whether rotating forwardly or reversely, can enable the speed-adjusting wheel set 16c to output directionally.

Figure 14:
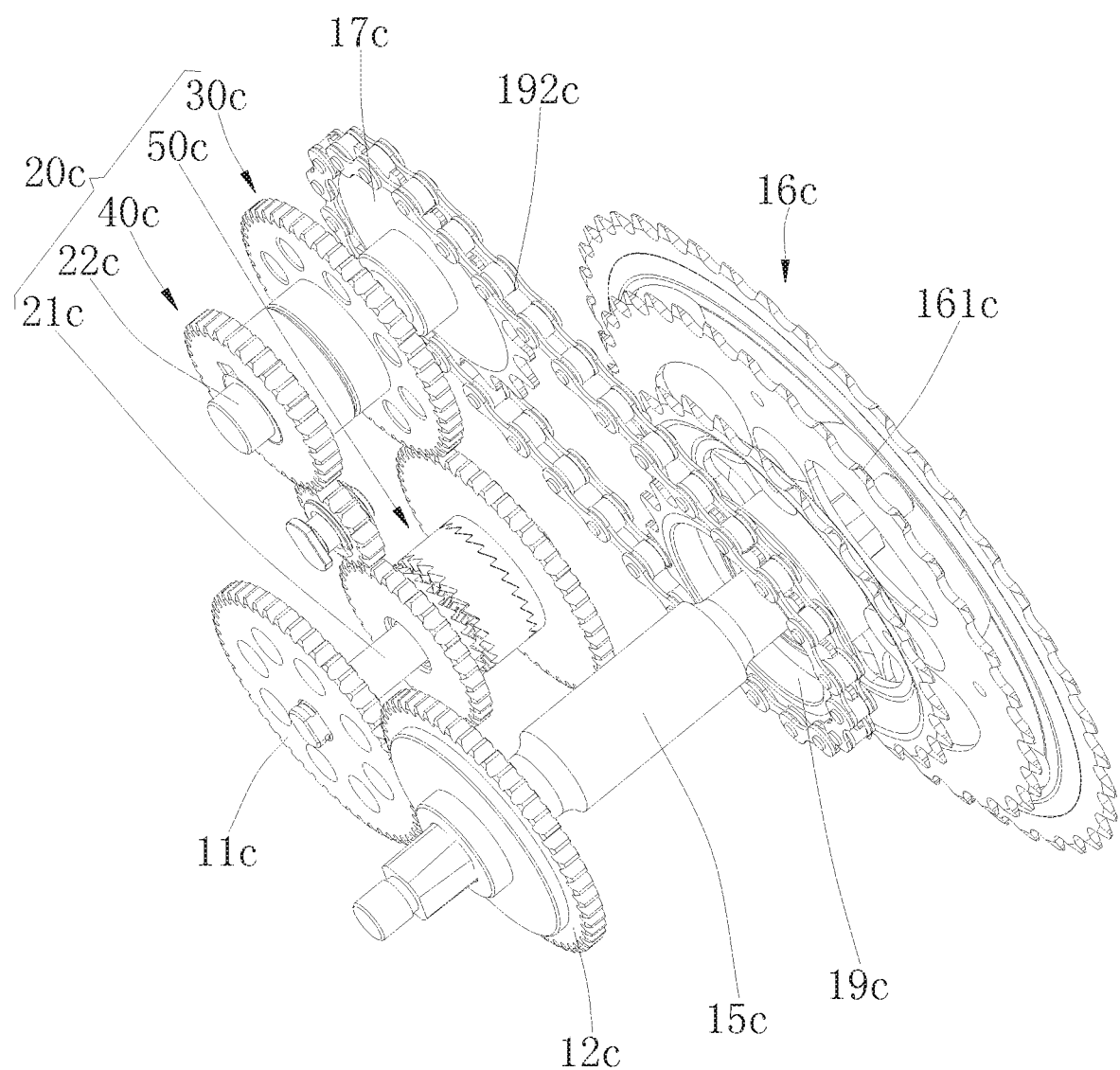
FIG. 14 is a perspective schematic view of an interior structure of the direction sprocket apparatus of FIG. 13.
Figure 15:
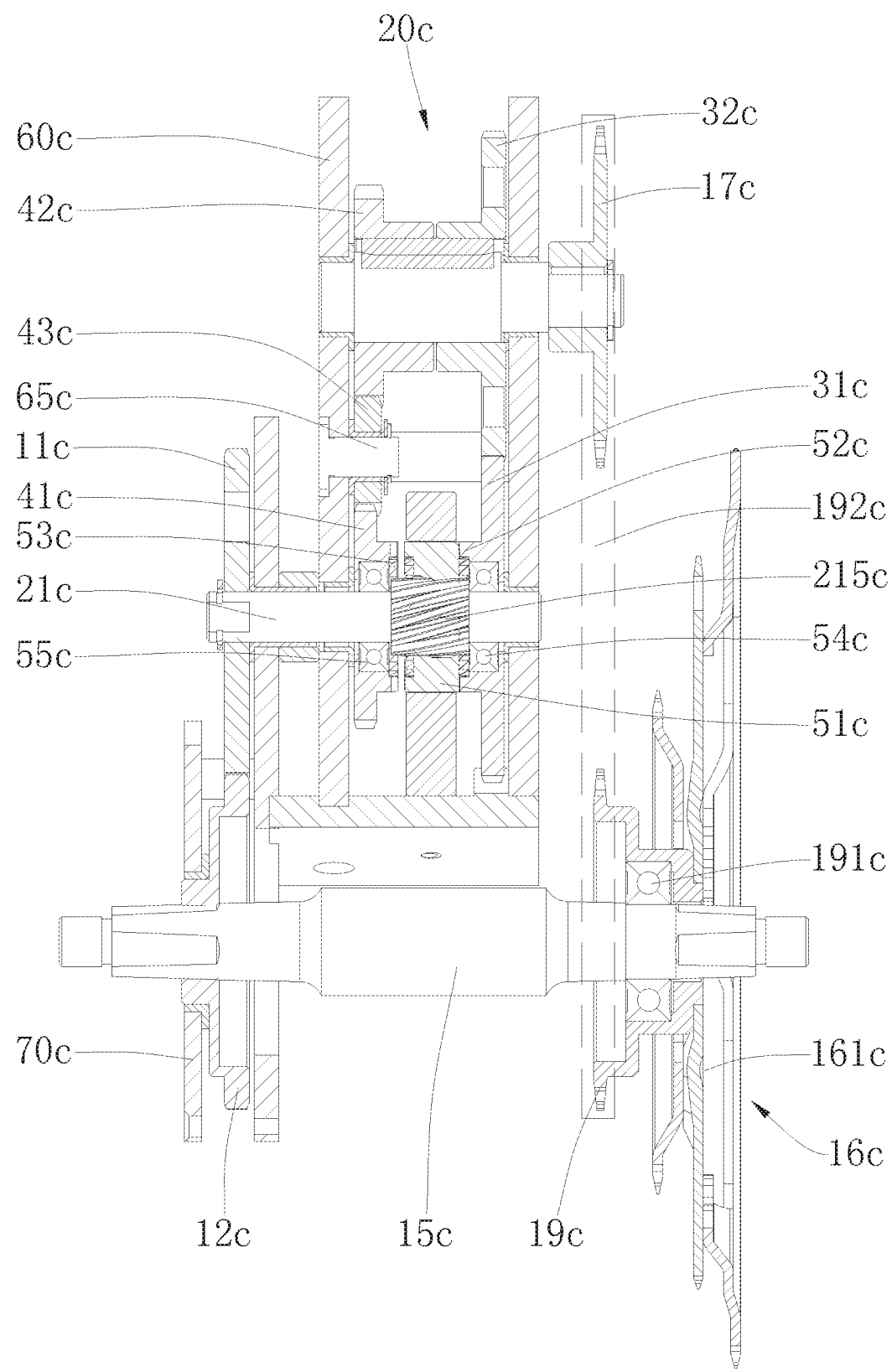
FIG. 15 is a sectional view of the directional sprocket apparatus of FIG. 14.
Figure 16:
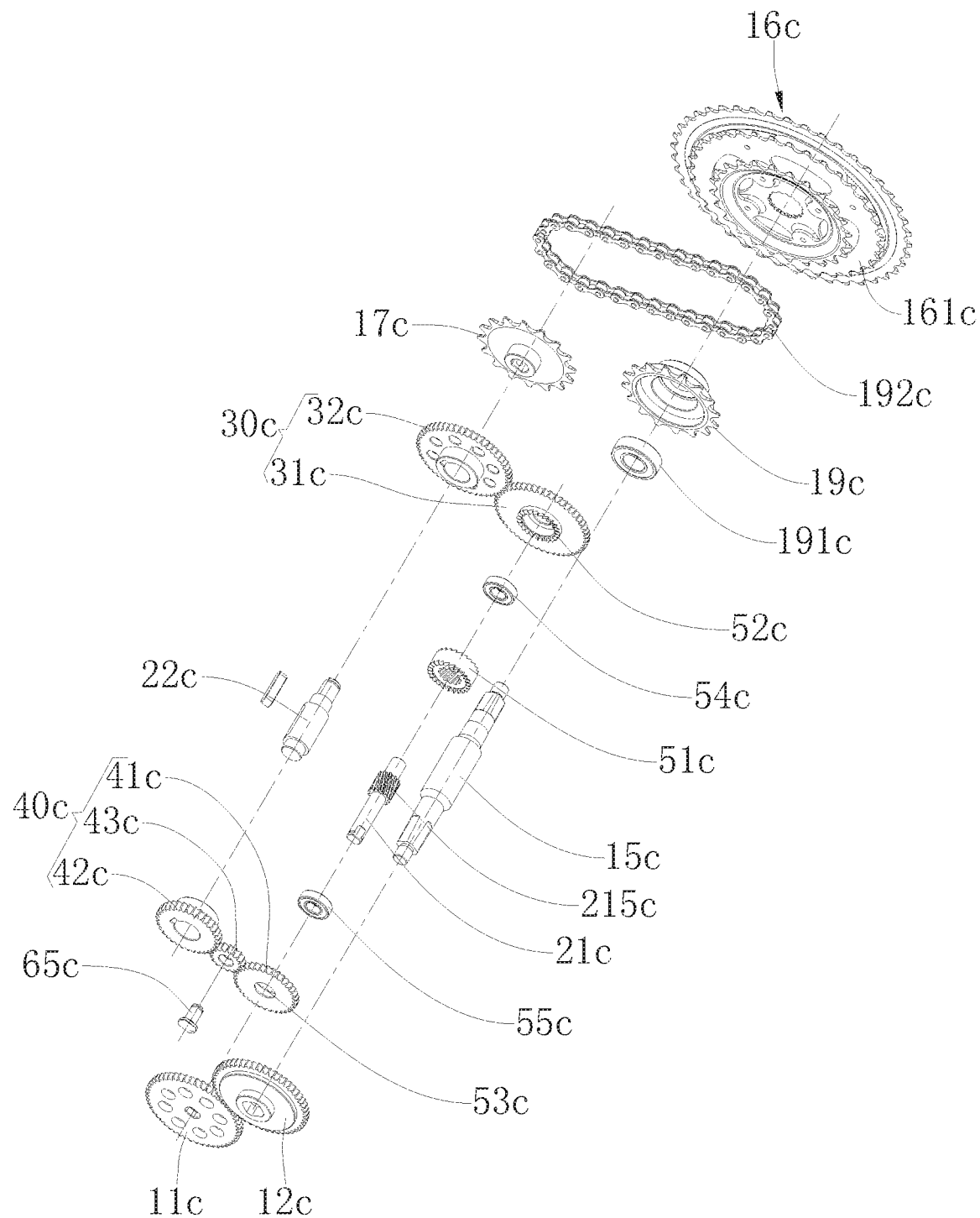
FIG. 16 is an exploded view of the directional sprocket apparatus of FIG. 14.

Please refer to FIG. 14, FIG. 15, and FIG. 16, the directional transmission mechanism 20c includes a driving shaft 21c, an output shaft 22c, a co-rotating wheel set 40c, a reverse-rotating wheel set 30c, and a switching mechanism 50c The co-rotating wheel set 40c is connected with the driving shaft 21c and the output shaft 22c, such that when the driving shaft 21c drives the co-rotating wheel set 40c to rotate so as to drive the output shaft 22c to rotate, the driving shaft 21c and the output shaft 22c can rotate in the same direction. The reverse-rotating wheel 30c is connected with the driving shaft 21c and the output shaft 22c, such that when the diving shaft 21c drives the reverse-rotating wheel set 30c to rotate so as to drive the output shaft 22c to rotate, the driving shaft 21c and the output shaft 22c can rotate in direction opposite to each other. The switching mechanism 50c is used to switch the driving shaft 21c to drive the co-rotating wheel set 40c to rotate or drive the reverse-rotating wheel set 30c to rotate. As a result, whether the driving shaft 21c rotates forwardly or reversely, the output shaft 22c can always rotate in the same direction, without changing in direction along with the change of the rotating direction of the driving shaft 21c, thereby achieving a directional transmission. The slave transmission wheel 11c is mounted on the driving shaft 21c, and the output wheel 17c is mounted on the driving shaft 22c, such that rotation of the transmission shaft 15c can be transmitted to the driving shaft 21c for the directional transmission mechanism 20c to change a direction of the rotation and drive the output wheel 17c to rotate, thereby outputting power to the speed-adjusting wheel set 16c.

Please refer to FIG. 14, FIG. 15, FIG. 16, and FIG. 17, further, the switching mechanism 50c includes first meshing teeth 52c, second meshing teeth 53c, and a sliding sleeve 51c. The first meshing teeth 52c are used to drive the reverse-rotating wheel set 30c, and the second meshing teeth 53c are used to drive the co-rotating wheel set 40c to rotate.

Both the first meshing teeth 52c and the second meshing teeth 53c are ratchet teeth, and an orientation of the first meshing teeth 52c is opposite to an orientation of the second meshing teeth 53c. The first meshing teeth 52c, the sliding sleeve 51c, and the second meshing teeth 53c are sequentially attached around the driving shaft 21c, and two ends of the sliding sleeve 51c are respectively provided with ratchet teeth 515c configured to mesh with the first meshing teeth 51c and the second meshing teeth 52c. The ratchet teeth 515c at one end of the sliding sleeve 51c are used to mesh with the first meshing teeth 52c, and the ratchet teeth 515c at another end of the sliding sleeve 51c are used to mesh with the second meshing teeth 53c, so as to drive the reverse-rotating wheel set 30c or the co-rotating wheel set 40c to rotate. A sliding groove 215c on the driving shaft 21c is spiral-shaped, such that spiral external teeth are formed on the driving shaft 21c, and the sliding sleeve 51c is provided therein with spiral internal teeth 516c meshing with the spiral external teeth. When the slave transmission wheel 11c rotates, the driving shaft 21c is driven to rotate, the spiral internal teeth 516c of the sliding sleeve 51c mesh with the spiral external teeth on the driving shaft 21c, and thus the sliding sleeve 51c can be pushed to move on the driving shaft 21c. When the driving shaft 21c rotates reversely, the driving shaft 21c pushes the sliding sleeve 51c to move towards the first meshing teeth 52c, making the sliding sleeve 51c mesh with the first meshing teeth 52c, so as to drive the first meshing teeth 52c to rotate. The first meshing teeth 52c in turn drive the reverse-rotating wheel set 30c to rotate, which in turn drives the output shaft 22c to rotate in a direction opposite to that of the driving shaft 51c. When the driving shaft 21c rotates forwardly, the driving shaft 21c pushes the sliding sleeve 51c to move towards the second meshing teeth 53c, making the sliding sleeve 51c mesh with second meshing teeth 53c, so as to drive the second meshing teeth 53c to rotate. The second meshing teeth 53c in turn drive the co-rotating wheel set 40c to rotate, which in turn drives the output shaft 22c to rotate in the same direction as that of the driving shaft 21c.

Figure 13:
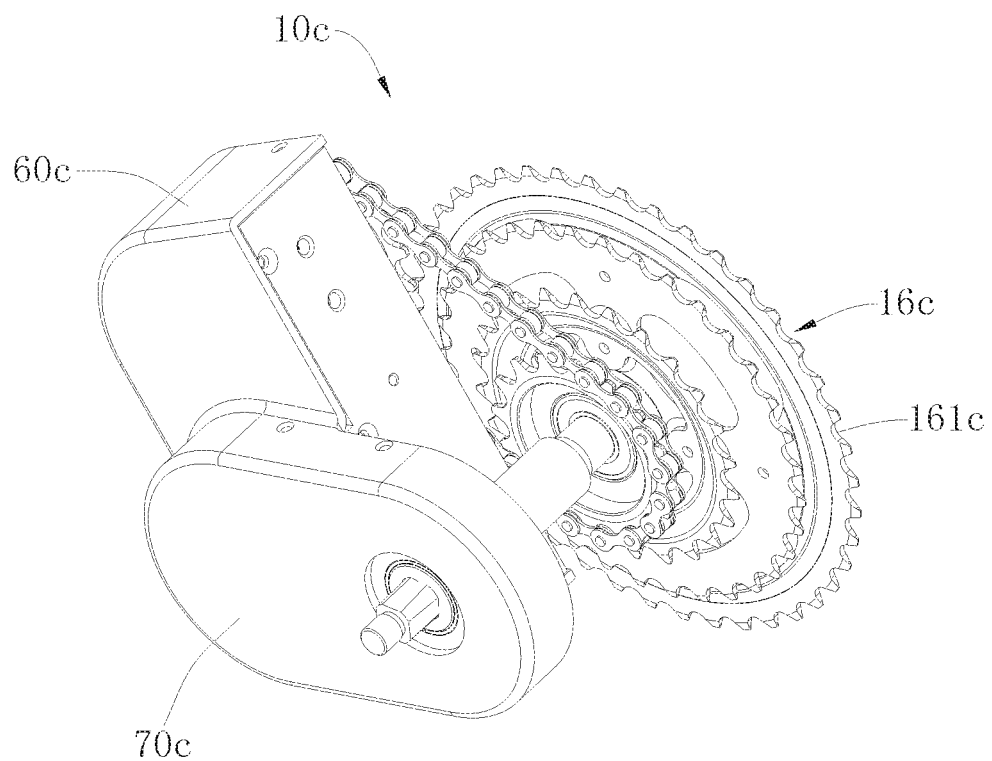
FIG. 13 is a perspective view of a directional sprocket apparatus provided by a third embodiment of the present invention.
Figure 17:
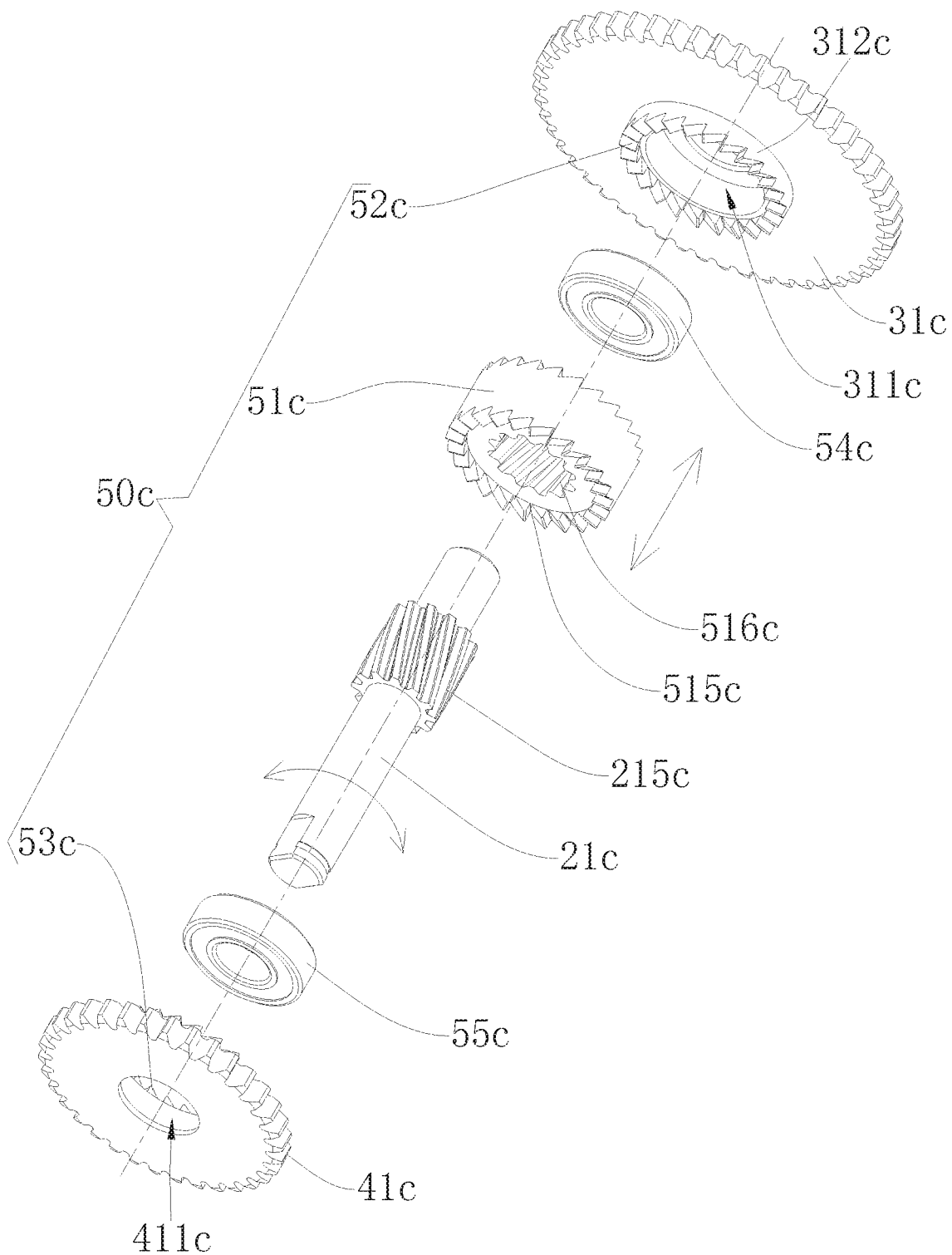
FIG. 17 is an exploded view of a switching mechanism, a first master gear, and a second master gear of a directional transmission mechanism of the directional sprocket apparatus of FIG. 14.

Please refer to FIG. 13, FIG. 16, and FIG. 17, a detailed description is provided with reference to left and right directions in FIG. 17. It is noted, however, that the reference to the left and right directions here is only intended to illustrate conveniently with respect to the drawings, rather than to limit the directions of various structural components that are actually used. When the transmission shaft 15c rotates forwardly to drive the driving shaft 21c to rotate reversely, the sliding sleeve 51c is acted by the spiral external teeth on the driving shaft 21c, so as to slide rightwards and separate from the second meshing teeth 53c. Afterwards, the sliding sleeve 51c meshes with the first meshing teeth 52c, and drives the reverse-rotating wheel 30c to rotate. Under the drive of the reverse-rotating wheel set 30c, the output shaft 22c is driven to rotate in a direction opposite to the driving shaft 21c, making the output shaft 22c rotate in the same direction as that of the transmission shaft 15c. When the transmission shaft 15c rotates reversely to drive the driving shaft 21c to rotate forwardly, the sliding sleeve 51c is acted by the spiral external teeth on the driving shaft 21c, so as to slide leftwards and separate from the first meshing teeth 52c. Afterwards, the sliding sleeve 51c meshes with the second meshing teeth 53, and drives the co-rotating wheel set 40c to rotate. Under the drive of the co-rotating wheel set 40c, the output shaft 22c is driven to rotate in the same direction as that of the driving shaft 21c, making the output shaft 22c rotate in a direction opposite to that of the transmission shaft 15c. This structure can realize an automatic switching between driving the co-rotating wheel set 40c and driving the reverse-rotating wheel set 30c to rotate according to a rotating direction of the driving shaft 21c, and is simple in structure, convenient to manufacture, and reliable in movement.

Further, the directional sprocket apparatus 10c further include a first bearing 54c and a second bearing 55c, both the first bearing 54c and the second bearing 55c are mounted on the driving shaft 21c, and the sliding sleeve 51c is located between the first bearing 54c and the second bearing 55c. The first meshing teeth 52c are supported by the first bearing 54c, and the second meshing teeth 53c are supported by the second bearing 55c, such that the first meshing teeth 52c and the second meshing teeth 53c can rotate agilely on the driving shaft 21c, and abrasion between the driving shaft 21c and the first meshing teeth 52c and between the driving shaft 21c and the second meshing teeth 53c can be avoided or reduced.

Please refer to FIG. 14, FIG. 15, FIG. 16, and FIG. 17, the reverse-rotating wheel set 30c includes a first master gear 31c and a first slave gear 32c. A center of the first master gear 31c is provided with a first shaft hole 311c for fitting with the driving shaft 21c. The first master gear 31c is attached around the driving shaft 21c, and the first meshing teeth 52c are arranged on the first master gear 31c. The first slave gear 32c is connected with the output shaft 22c, and the first slave gear 32c meshes with the first master gear 31c. With the first slave gear 32c meshing with the first master gear 31c, the first slave gear 32c rotates in a direction opposite to that of the first master gear 31c, so as to drive the output shaft 22c to rotate in a direction opposite to that of the driving shaft 21c. In this embodiment, the reverse-rotating wheel set 30c has only two gears, which has a simple structure and low cost. When the reverse-rotating wheel set 30c includes an even number of gears meshing sequentially, it can be ensured that the foremost gear and the aftermost gear rotate in directions opposite to each other, such that the output shaft 22c can be driven to rotate in a direction opposite to that of the driving shaft 21c. In other embodiments, the reverse-rotating wheel set 30c can include an even number of gears meshing sequentially, the foremost gear is the first master gear 31c, and the aftermost gear is the first slave gear 32c connected with the output shaft 22c.

Further, a side of the first master gear 31c close to the sliding member is provided with a first cam 312c, and the first meshing teeth 52c are arranged on a side of the first cam 312c away from the first master gear 31c. In this embodiment, the first meshing teeth 52c are arranged on a side surface of the first cam 312c. In this embodiment, the first cam 312c and the first master gear 31c are formed integrally and have high strength. In other embodiments, the first cam 312c and the first master gear 31c can also be made separately, and then the first cam 312c is fixedly connected with the first master gear 31c.

Further, the co-rotating wheel set 40c includes a second master gear 41c, a second slave gear 42c, and an idle gear 43c. A center of the second master gear 41c is provided with a second shaft hole 411c for fitting with the driving shaft 21c, the second master gear 41c is attached around the driving shaft 21c, and the second meshing teeth 53c are arranged on the second master gear 41c. The second slave gear 42c is connected with the output shaft 22c and arranged to be spaced from the second master gear 41c, and the idle gear 43c operatively meshes the second master gear 41c and the second slave gear 42c. With the idle gear 43c operatively meshing the second master gear 41c and the second slave gear 42c, the second master gear 41c rotates in a direction opposite to that of the idle gear 43c, and the idle gear 43c rotates in a direction opposite to that of the second slave gear 42c, such that the second slave gear 42c rotates in the same direction as that of the second master gear 41c, thereby driving the output shaft 22c to rotate in the same direction as that of the driving shaft 21c. In this embodiment, the co-rotating wheel set 40c has only three gears, which has a simple structure and low cost. When the co-rotating wheel set 40c includes an odd number of gears meshing sequentially, it can be ensured that the foremost gear and the aftermost gear rotate in the same direction, such that the output shaft 22c can be driven to rotate in the same direction as that of the driving shaft 21c. In other embodiments, the co-rotating wheel set 40c can include an odd number of gears meshing sequentially, the foremost gear is the second master gear 41c, the aftermost gear is the second slave gear 42c connected with the output shaft 22c, and an odd number of intermediate gears are idle gears 43c.

Further, a side of the second master gear 41c close to the sliding member is provided with a second cam, and the second meshing teeth 53c are arranged on a side of the second cam away from the second master gear 41c. In this embodiment, the second meshing teeth 53c are arranged on a side surface of the second cam. In this embodiment, the second cam 412c and the second master gear 41c are formed integrally and have high strength. In other embodiments, the second cam 412c and the second master gear 41c can also be made separately, and then the second cam 412c is fixedly connected with the second master gear 41c.

Please refer to FIG. 13, FIG. 14, FIG. 15, and FIG. 16, the directional sprocket apparatus 10c further includes a support frame 60c. The driving shaft 21c and the output shaft 22c are pivoted in the support frame 60c, and the slave transmission wheel 11c and the output wheel 17c are respectively located at two opposite sides of the support frame 60c. By pivoting the driving shaft 21c and the output shaft 22c in the support frame 60c, the directional transmission mechanism 20c can be supported by the support frame 60c, which also provides protection for the directional transmission mechanism 20c. In addition, when the directional sprocket apparatus 10c is used, the support frame 60c can be fixed in place, so as to support the directional transmission mechanism 20c. Further, a support shaft 65c can be mounted in the support frame 60c to support the idle gear 43c of the co-rotating wheel set 40c, making the idle gear 43c rotate more smoothly. The support frame 60c can be made of a plurality of plate bodies, so as to reduce the difficulty in manufacture and lower the cost. In other embodiments, the support frame 60c can also be integrally formed by casting to facilitate the assembly.

Further, the directional sprocket apparatus 10c further includes a protection cover 70c. Using the protection cover 70c to cover the master transmission wheel 12c and the slave transmission wheel 11c can provide protection for the master transmission wheel 12c and the slave transmission wheel 11c. In addition, when the transmission shaft 15c rotates, using the protection cover 70c to cover the master transmission wheel 12c and the slave transmission wheel 11c can also prevent the master transmission wheel 12c and the slave transmission wheel 11c from scratching users, thereby providing a safety protection function. Further, the transmission shaft 15c can be supported by the protection cover 70c, making the transmission shaft 15c rotate more smoothly. Furthermore, a bearing can be mounted at a connection area between the protection cover 70c and the transmission shaft 15c, such that the protection cover 70c supports the transmission shaft 15c via the bearing. Further, the protection cover 70c can be fixedly connected with the support frame 60c.

Other structures of the directional sprocket apparatus 10c of this embodiment are similar to other structures of the directional sprocket apparatus of the second embodiment, and explanations thereof are therefore not repeated herein.

Figure 18:
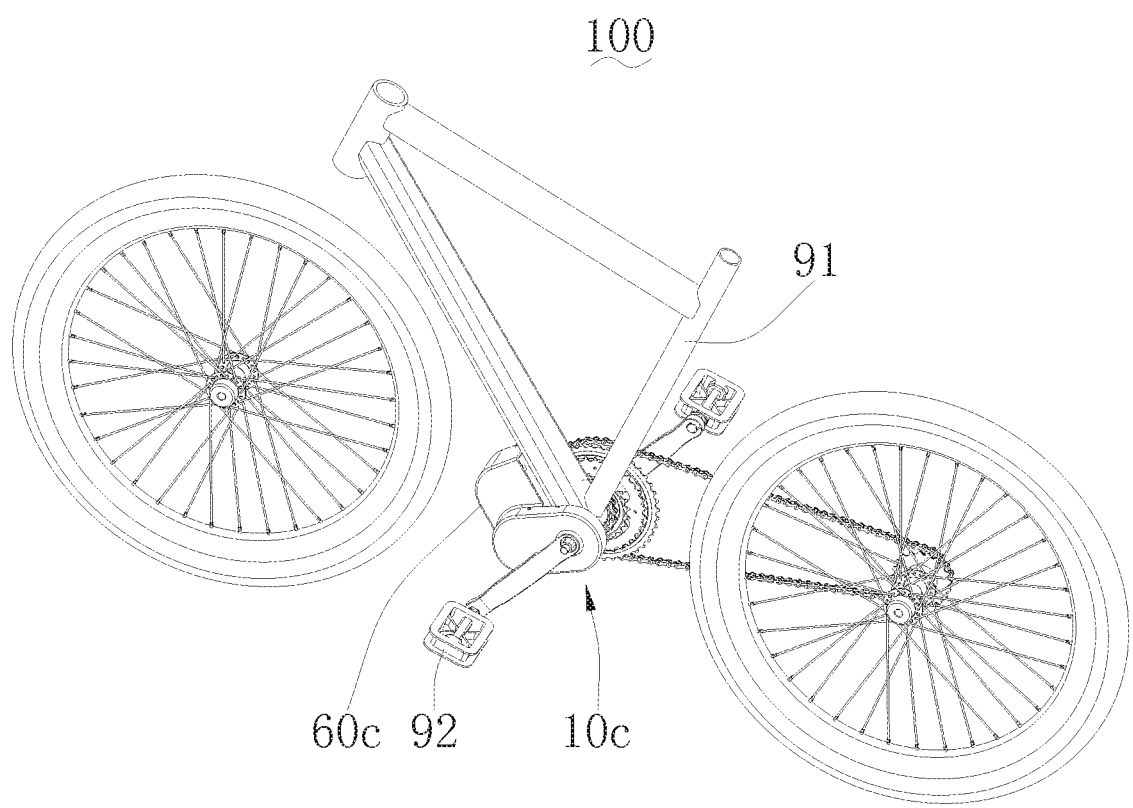
FIG. 18 is a perspective structural schematic view of a pedal device provided by an embodiment of the present invention.

Please refer to FIG. 18, one embodiment of the present invention further discloses a pedal device 100, which comprises a frame 91, the aforementioned directional sprocket apparatus 10c fixed on the frame 91, and foot pedals 92 that are respectively mounted at two ends of the transmission shaft 15c of the directional sprocket apparatus 10c. The transmission shaft 15c is mounted on the frame 91. It is particularly noted that: with respect to an existing bicycle, only the directional transmission mechanism is required to be mounted on the bicycle; both the transmission shaft 15c and the output sprocket wheels 16c can be original components of the bicycle, and an original structure of the bicycle needs not to be modified. This pedal device 100 (such as the bicycle) uses the aforementioned directional sprocket apparatus 10c. Therefore, when the foot pedals 92 are pedaled forwardly, the pedal device 100 can be driven to move forwardly; when the foot pedals 92 are pedaled reversely, the pedal device 100 can also be driven to move forwardly. In addition, since it is realized that both forward and reverse rotations of the transmission shaft 15c can drive the output shaft 22c to rotate forwardly, the pedal device has an improved driving efficiency and brings fun by providing a different riding experience. Further, the transmission shaft 15c can be mounted on the frame 91 via bearings, such that the transmission shaft 15c can rotate agilely on the frame 91. In some other embodiments, the transmission shaft 15c can also be mounted on the frame by a bushing.

Please also refer to FIG. 13, in this embodiment, the pedal device 100 is a bicycle, the transmission shaft 15c is mounted in a bottom bracket hole of the bicycle via bottom bracket bearings of the bicycle, and the support frame 60c of the directional sprocket apparatus 10c is fixed on the frame 91, so as to support and secure the directional sprocket apparatus 10c more stably.

In other embodiments, the pedal device 100 can also be a device that can be driven by bidirectional rotations to output a unidirectional rotation, such as a pedal boat, a pedal generator, and so on.

The above contents are only preferred embodiments of the present invention, and are not intended to limit the present invention. Any modification, equivalent replacement or improvement made within the spirit and principle of the present invention should be included in the protection scope of the present invention.

What is claimed is:

1. A directional sprocket apparatus, comprising:
  a directional transmission mechanism comprising:
    a driving shaft;
    an output shaft;
    a co-rotating wheel set connected with the driving shaft and the output shaft and configured to drive the output shaft to rotate in a direction that is a same as that of the driving shaft;
    a reverse-rotating wheel set connected with the driving shaft and the output shaft and configured to drive the output shaft to rotate in a direction opposite to that of the driving shaft; and
    a switching mechanism configured to switch the driving shaft to drive the co-rotating wheel set or drive the reverse-rotating wheel set to rotate, so as to enable the output shaft to rotate directionally, wherein the switching mechanism includes first meshing teeth configured to drive the reverse-rotating wheel set to rotate, second meshing teeth configured to drive the co-rotating wheel set to rotate, and a sliding member configured to be fittingly connected with the first meshing teeth or the second meshing teeth, and wherein both the first meshing teeth and the second meshing teeth are ratchet teeth, and a ratchet orientation of the first meshing teeth is opposite to a ratchet orientation of the second meshing teeth; the sliding member is slidably mounted on the driving shaft, one end of the sliding member has a toothed configuration for meshing with the first meshing teeth, another end of the sliding member has a toothed configuration for meshing with the second meshing teeth, and the driving shaft is provided thereon with a sliding groove for guiding the sliding member to slide back and forth between the first meshing teeth and the second meshing teeth;
  a slave transmission wheel configured to drive the driving shaft of the directional transmission mechanism to rotate;
  a master transmission wheel configured to drive the slave transmission wheel to rotate;
  a transmission shaft supporting the master transmission wheel; and
  an output wheel connected with the output shaft.

2. The directional sprocket apparatus according to claim 1, wherein the output wheel is a flywheel, and both the slave transmission wheel and the master transmission wheel are sprocket wheels; the directional sprocket apparatus further comprises a transmission chain fittingly connected with the master transmission wheel and the slave transmission wheel.

3. The directional sprocket apparatus according to claim 1, wherein the output wheel is a gear, both the slave transmission wheel and the master transmission wheel are sprocket wheels, and the directional sprocket apparatus further comprises a transmission chain fittingly connected with the master transmission wheel and the slave transmission wheel, a speed-adjusting wheel set attached around the transmission shaft, and a driving gear configured to drive the speed-adjusting wheel set to rotate; the driving gear meshes with the output wheel, and the driving gear is connected with the speed-adjusting wheel set.

4. The directional sprocket apparatus according to claim 1, wherein the output wheel is a sprocket wheel, the slave transmission wheel and the master transmission wheel are gears meshing with each other, and the directional sprocket apparatus further comprises a speed-adjusting wheel set attached around the transmission shaft, a driving sprocket wheel configured to drive the speed-adjusting wheel set to rotate, and a driving chain fittingly connected with the output wheel and the driving sprocket wheel.

5. The directional sprocket apparatus according to claim 1, wherein the sliding member is a sliding block slidably mounted in the sliding groove, the sliding groove is arranged along an axial direction of the driving shaft.

6. The directional sprocket apparatus according to claim 1, wherein the directional transmission mechanism further includes a connecting sleeve configured to position the sliding block on the driving shaft, the connecting sleeve defines a through hole for fitting with the driving shaft, a groove is formed in a sidewall defining the through hole, corresponding to the sliding groove, openings are defined respectively in two ends of the connecting sleeve, corresponding to the groove, an elastic positioning assembly is mounted in each of the openings and configured to position the corresponding sliding block, and two ends of the sliding block defines positioning grooves fitting with the elastic positioning assemblies.

7. The directional sprocket apparatus according to claim 6, wherein each elastic positioning assembly includes a ball mounted in the opening, a spring biasing the ball towards the sliding block, and a locking block for fixing the spring in the opening, and the ball and the locking block are respectively located at two ends of the spring.

8. The directional sprocket apparatus according to claim 1, wherein the sliding groove is spiral, the sliding member is a sliding sleeve attached around the driving shaft, two ends of the sliding sleeve have toothed configurations, and the sliding sleeve is provided therein with spiral internal teeth meshing with the sliding groove.

9. The directional sprocket apparatus according to claim 1, wherein the reverse-rotating wheel set includes a first master gear attached around the driving shaft and a first slave gear meshing with the first master gear, the first slave gear is connected with the output shaft, and the first meshing teeth are arranged on the first master gear.

10. The directional sprocket apparatus according to claim 9, wherein a side of the first master gear close to the sliding member is provided with a first cam, and the first meshing teeth are arranged on a side of the first cam away from the first master gear.

11. The directional sprocket apparatus according to claim 1, wherein the co-rotating wheel set includes a second master gear attached around the driving shaft, a second slave gear connected with the output shaft, and an idle gear fittingly meshing with the second master gear and the second slave gear, the second slave gear is arranged to be spaced from the second master gear, and the second meshing teeth are arranged on the second master gear.

12. The directional sprocket apparatus according to claim 11, wherein a side of the second master gear close to the sliding member is provided with a second cam, and the second meshing teeth are arranged on a side of the second cam away from the second master gear.

13. The directional sprocket apparatus according to claim 1, wherein the directional transmission mechanism further comprises a support frame configured to support the driving shaft, the co-rotating wheel set, the reverse-rotating set, and the output shaft.

14. A pedal device comprising:
   a frame;
   a directional sprocket apparatus comprising:
      a directional transmission mechanism comprising:
         a driving shaft;
         an output shaft;
         a co-rotating wheel set connected with the driving shaft and the output shaft and configured to drive the output shaft to rotate in a direction that is the same as that of the driving shaft;
         a reverse-rotating wheel set connected with the driving shaft and the output shaft and configured to drive the output shaft to rotate in a direction opposite to that of the driving shaft; and
         a switching mechanism configured to switch the driving shaft to drive the co-rotating wheel set or drive the reverse-rotating wheel set to rotate, so as to enable the output shaft to rotate directionally, wherein the switching mechanism includes first meshing teeth configured to drive the reverse-rotating wheel set to rotate, second meshing teeth configured to drive the co-rotating wheel set to rotate, and a sliding member configured to be fittingly connected with the first meshing teeth or the second meshing teeth, and wherein both the first meshing teeth and the second meshing teeth are ratchet teeth, and a ratchet orientation of the first meshing teeth is opposite to a ratchet orientation of the second meshing teeth; the sliding member is slidably mounted on the driving shaft, one end of the sliding member has a toothed configuration for meshing with the first meshing teeth, another end of the sliding member has a toothed configuration for meshing with the second meshing teeth, and the driving shaft is provided thereon with a sliding groove for guiding the sliding member to slide back and forth between the first meshing teeth and the second meshing teeth;
      a slave transmission wheel configured to drive the driving shaft of the directional transmission mechanism to rotate;
      a master transmission wheel configured to drive the slave transmission wheel to rotate;
      a transmission shaft supporting the master transmission wheel; and
      an output wheel connected with the output shaft; and
   a foot pedal configured to drive the transmission shaft of the directional sprocket apparatus to rotate, the transmission shaft being mounted on the frame.

15. The pedal device according to claim 14, wherein the pedal device is resulted by attaching the directional transmission mechanism as an add-on to an existing pedal device without modifying an original structure of the existing pedal device, the frame, the transmission shaft, the output wheel and the foot pedal are original parts of the existing pedal device, the transmission shaft of the directional sprocket apparatus is configured to be driven to rotate by the original foot pedal of the pedal device, and the output wheel of the directional sprocket apparatus is configured to drive an original sprocket wheel of a rear wheel of the existing pedal device to rotate forwardly.

16. The pedal device according to claim 14, wherein the sliding member is a sliding block slidably mounted in the sliding groove, the sliding groove is arranged along an axial direction of the driving shaft.

17. The pedal device according to claim 16, wherein the directional transmission mechanism further includes a connecting sleeve configured to position the sliding block on the driving shaft, the connecting sleeve defines a through hole for fitting with the driving shaft, a groove is formed in a sidewall defining the through hole, corresponding to the sliding groove, openings are defined respectively in two ends of the connecting sleeve, corresponding to the groove, an elastic positioning assembly is mounted in each of the openings and configured to position the corresponding sliding block, and two ends of the sliding block defines positioning grooves fitting with the elastic positioning assemblies.

18. The pedal device according to claim 17, wherein each elastic positioning assembly includes a ball mounted in the opening, a spring biasing the ball towards the sliding block, and a locking block for fixing the spring in the opening, and the ball and the locking block are respectively located at two ends of the spring.

19. The pedal device according to claim 14, wherein the sliding groove is spiral, the sliding member is a sliding sleeve attached around the driving shaft, two ends of the sliding sleeve have toothed configurations, and the sliding sleeve is provided therein with spiral internal teeth meshing with the sliding groove.

20. The pedal device according to claim 14, wherein the reverse-rotating wheel set includes a first master gear attached around the driving shaft and a first slave gear meshing with the first master gear, the first slave gear is connected with the output shaft, and the first meshing teeth are arranged on the first master gear.

* * * * *